US012070434B2

(12) United States Patent
Gigstad

(10) Patent No.: US 12,070,434 B2
(45) Date of Patent: *Aug. 27, 2024

(54) WEARABLE DEVICE FOR ASSISTING LIMB MOVEMENT

(71) Applicant: GIGSTRIDE CORPORATION, Tucson, AZ (US)

(72) Inventor: Gavin W. Gigstad, Tucson, AZ (US)

(73) Assignee: GIGSTRIDE CORPORATION, Tucson, AZ (US)

(*) Notice: Subject to any disclaimer, the term of this patent is extended or adjusted under 35 U.S.C. 154(b) by 0 days.

This patent is subject to a terminal disclaimer.

(21) Appl. No.: 18/492,558

(22) Filed: Oct. 23, 2023

(65) Prior Publication Data

US 2024/0065921 A1 Feb. 29, 2024

Related U.S. Application Data

(63) Continuation-in-part of application No. 18/152,545, filed on Jan. 10, 2023.

(60) Provisional application No. 63/328,169, filed on Apr. 6, 2022.

(51) Int. Cl.
*A61H 3/00* (2006.01)
*A61H 1/02* (2006.01)

(52) U.S. Cl.
CPC ............. *A61H 3/00* (2013.01); *A61H 1/0262* (2013.01); *A61H 2003/007* (2013.01); *A61H 2201/1253* (2013.01); *A61H 2201/1621* (2013.01); *A61H 2201/1642* (2013.01); *A61H 2201/1652* (2013.01)

(58) Field of Classification Search
CPC ........ B25J 9/0006; A61H 3/00; A61H 1/0262; A61H 2003/007; A61H 2201/1253; A61H 2201/1621; A61H 2201/1642; A61H 2201/1652; A63B 21/00; A63B 21/00043
USPC .................................................. 482/121–124
See application file for complete search history.

(56) References Cited

U.S. PATENT DOCUMENTS 1,308,675 A * 7/1919 Kelley .................. B25J 9/0006 601/35
5,186,701 A * 2/1993 Wilkinson ....... A63B 21/00065 482/121
5,203,754 A * 4/1993 Maclean ............ A63B 21/4015 482/121

(Continued)

OTHER PUBLICATIONS

Becker Rehabilitation Products https://beckerorthopedic.com/Landing/HFAD Retrieved Jan. 24, 2024.

*Primary Examiner* — Tu A Vo
*Assistant Examiner* — Kelsey E Baller
(74) *Attorney, Agent, or Firm* — NGUYEN TARBET IP LAW

(57) ABSTRACT

A wearable device for assisting in the movement of lower limbs that includes an anchor component configured to encircle the torso of a user and be supported by the shoulders through a harness/suspender that provides both postural support and proprioceptive input. The wearable device may have one or more elastic cords disposed on the anchor component and a means for aligning the one or more elastic cords. Each cord may have a first and second attachment component on each end, which may attach to a first shoe and a second shoe of the user. Lowering the cord end by the attachment component may cause the other cord end to rise.

1 Claim, 24 Drawing Sheets

(56) References Cited

U.S. PATENT DOCUMENTS

| | | | |
|---|---|---|---|
| 7,931,571 | B2 | 4/2011 | Bernardoni |
| 2010/0271051 | A1 | 10/2010 | Sankai et al. |
| 2017/0119613 | A1 * | 5/2017 | Roh ..................... A61H 1/0237 |
| 2018/0280178 | A1 * | 10/2018 | Shimada ................ B25J 9/1045 |
| 2019/0343670 | A1 * | 11/2019 | Ruprecht ............. A61H 1/0274 |
| 2020/0237600 | A1 | 7/2020 | Arai et al. |
| 2021/0113412 | A1 | 4/2021 | Holgate et al. |
| 2021/0330541 | A1 | 10/2021 | Katagiri et al. |
| 2021/0378904 | A1 * | 12/2021 | Lerner ................... B25J 9/0006 |
| 2022/0241131 | A1 | 8/2022 | Papania-Davis et al. |
| 2022/0401285 | A1 | 12/2022 | Murphy et al. |

* cited by examiner

WEARABLE DEVICE FOR ASSISTING LIMB MOVEMENT

CROSS-REFERENCES TO RELATED APPLICATIONS

This application is a continuation-in-part and claims benefit of U.S. patent application Ser. No. 18/152,545 filed Jan. 10, 2023, which is a non-provisional and claims benefit of U.S. Provisional Application No. 63/328,169 filed Apr. 6, 2022, the specifications of which are incorporated herein in their entirety by reference.

FIELD OF THE INVENTION

The present invention is directed to a wearable device implementing a reciprocating system of encased elastic cords to facilitate and enhance a natural gait, improve balance, and reduce falls.

BACKGROUND OF THE INVENTION

People who experience mobility or endurance issues due to trauma, joint replacement, stroke, or degenerative diseases (Multiple Sclerosis, Parkinson's, Ataxia) or fatigue may require specialized devices to aid them in walking on their own. Standard assistive devices such as canes, walkers, and crutches allow for straightforward assistance in balance and movement. However, these devices tend to be restrictive, require the use of the arms to support the weight of the user, and may prevent the user from moving through tight spaces. Other leg support devices include braces, splints, and certain orthotics. However, these devices provide rigid support, limiting movement of the lower leg, ankle, and foot, leading to further weakness of the muscles and structures in the affected area. Finally, there are devices with straps attached to the shoe via the shoe laces and pull from the waistband. But, this configuration puts pressure on the hip and waist, creating side pull, negatively affecting pelvic tilt and rotation, as well as creating excess pressure on the structures of the foot caused by using the laces of the shoe to lift the leg. This problem of excess pressure on the foot/feet is eliminated by the design aspect of the present invention by anchoring at both sides of both shoes.

Numerous devices exist to manage foot drop, with ankle-foot orthosis offering static or semi-static connections from the toe area of the shoe to the ankle or knee area. However, these devices are limited in terms of their effectiveness and their ability to be worn for timeframes people require because of the pressure on the skin and/or circulatory structures on focused areas of the lower leg and/or the restriction or elimination of the wearers' ability to perform any number of ankle and/or foot movements. Thus, there is a need for assistive devices for foot drop that allow for a wide range of movement and full range of motion while supporting and facilitating dorsiflexion and improving balance. The present invention incorporates a more flexible correction for foot drop if needed, using the same principles, including passing through tube(s) which go around the body while allowing for dual-leg support and free undulation or reciprocating tension of cords. In addition, the device described herein supports lift as well as forward movement to the legs using the body's natural reciprocating motion.

BRIEF SUMMARY OF THE INVENTION

It is an objective of the present invention to provide wearable devices that assist the movement of lower limbs while walking through the use of supportive elastic and undulating cords, as specified in the independent claims. Embodiments of the invention are given in the dependent claims. Embodiments of the present invention can be freely combined with each other if they are not mutually exclusive.

In some embodiments, the present invention features wearable devices for assisting in the movement of lower limbs. The device may include an anchor component configured to wrap around a torso of a user (e.g., configured to loosely wrap around the torso of a user), a first elastic cord and a second elastic cord and a means for aligning the first elastic cord and the second elastic cord (e.g., an aligning component). The first elastic cord and the second elastic cord both comprise a first cord end and a second cord end. At least a portion of the first elastic cord and the second elastic cord is disposed on the anchor component (e.g., a posterior portion of the anchor component). The means for aligning the first elastic cord and the second elastic cord (e.g., an aligning component) is configured such that the first elastic cord is positioned to run laterally alongside a portion of a leg and the second elastic cord is positioned to run medially alongside a portion of the leg. In some embodiments, the means of aligning the first elastic cord and the second elastic cord (e.g., an aligning component) comprises a first tubing component and a second tubing component. In other embodiments, the means of aligning the first elastic cord and the second elastic cord (e.g., an aligning component) comprises one or more channel components each comprising a first channel and a second channel. In further embodiments, the means of aligning the first elastic cord and the second elastic cord (e.g., an aligning component) comprises a first tubing component and a second tubing component horizontally attached to at least a posterior portion of the anchor component and two channel components each comprising a first channel and a second channel attached to at least a lateral portion of the anchor component.

In some embodiments, the present invention features a wearable device for assisting in the movement of lower limbs. The wearable device may comprise an anchor component configured to encircle a torso of a user, at least one tubing component attached to at least a portion of the anchor component, and at least one elastic cord comprising a first cord end and a second cord end. At least a portion of the elastic cord is disposed within the tubing component. In some embodiments, the first cord end comprises a first attachment component, and the second cord end comprises a second attachment component. In other embodiments, the wearable device may comprise an anchor component configured to encircle a torso of a user, a plurality of tubing components attached to at least a portion of the anchor component, and a plurality of elastic cords comprising a first cord end and a second cord end. At least a portion of each of the plurality of elastic cords is disposed within a tubing component. In some embodiments, the first cord end comprises a first attachment component, and the second cord end comprises a second attachment component.

Furthermore, in some embodiments, the wearable device may comprise an anchor component configured to encircle a torso of a user, first and second tubing components attached to at least a portion of the anchor component, and a first and second elastic cord both comprising a first cord end and a second cord end. The first elastic cord is disposed within the first tubing component, and the second elastic cord is disposed within the second tubing component. In some embodiments, the first cord end comprises a first attachment component, and the second cord end comprises a second attachment component.

In other embodiments, the present invention may also feature a method of assisting with the movement of lower limbs of a user. The method may comprise fitting a user with a device as described herein. In some embodiments, a first attachment component of a first elastic cord is attached proximally to a first side of a first shoe, and a second attachment component of the first elastic cord is attached proximally to the first side of a second shoe, and a first attachment component of a second elastic cord is attached proximally to a second side of the first shoe and a second attachment component of the second elastic cord is attached proximally to the second side of the second shoe. In some embodiments, the first shoe is disposed on a first foot of the user, and the second shoe is disposed on the second foot of the user. The method may further comprise advancing the first foot of the user, then advancing the second foot of the user, and repeating the aforementioned steps. In some embodiments, advancing the first foot of the user stretches the first and second elastic cord and creates elastic tension, which pulls the second cord end of the first and second elastic cord of the second shoe, elevating the second shoe and advancing the second foot of the user stretches the first and second elastic cord and creates elastic tension, which pulls the first cord end of the first and second elastic cord of the first shoe, elevating the first shoe.

The devices described herein lift each leg by leveraging bilateral reciprocating tension and movement, improving both hip and knee flexion, as well as mitigating the effects of or treating Foot drop using tenets of kinesiology, ergonomics, maximizing the body's form and structure, and the serape effect. Elastic cords may wrap around the posterior aspect of a belt and/or harness of the device and anchor to the opposite foot, using the body's own skeletal supports, including shoulders and core, to provide proprioceptive input and allow a full range of motion.

There are numerous other benefits derived from the use of the presently claimed lower limb assistance devices. In patients with hemiparesis, ataxia, and/or general balance issues, the present invention allows for easier turning without causing the user to lose their balance. The device also served to improve posture in both standing and walking positions. The "knee snap," "hip-hike," and "swing-out" gait patterns commonly observed in patients with hemiparesis were greatly reduced by the limb assistance device described herein, and the patients/wearers were able to achieve a more natural and safe gait pattern. Users additionally experienced increased comfort levels during long walks and hikes. This was observed even in users without disabilities, allowing them to go further and faster with less effort.

Several unique and inventive technical features of the present invention teach away from devices currently in use and have yielded surprising benefits beyond what was anticipated. For example, the arrangement of the elastic cords, such that they transverse the body and engage the other limb, results in a repeating, rhythmic, and reciprocating transfer of energy, which lifts the trailing foot and results in a more powerful and balanced stride. The additional power and balance are achieved through dynamics similar to "The Serape Effect." Assisting the user to establish a more rhythmic walk is essential, as research has shown that merely swinging arms while walking increases efficiency by 12%!

The increased length of the cords allows for a greater range of elastic tension. This affords a wider range of adjustments to customize the device to potentially show documentable progress over time for therapy or rehabilitation settings. The tubes are designed to strategically position the elastic cords, reduce friction, and prevent skin irritation.

None of the presently known prior references or work has the unique, inventive technical features of the present invention.

Any feature or combination of features described herein are included within the scope of the present invention provided that the features included in any such combination are not mutually inconsistent as will be apparent from the context, this specification, and the knowledge of one of ordinary skill in the art. Additional advantages and aspects of the present invention are apparent in the following detailed description and claims.

BRIEF DESCRIPTION OF THE SEVERAL VIEWS OF THE DRAWING(S)

The features and advantages of the present invention will become apparent from a consideration of the following detailed description presented in connection with the accompanying drawings in which:

FIGS. 1A, 1B, 1C, and 1D shows various embodiments of the limb assistance device (100) of the present invention. FIG. 1A shows a limb assistance device (100) comprising two tubing components (120) attached to the anchor components (110) and two elastic cords (130) disposed through a portion of the tubing components (120). FIG. 1B shows a limb assistance device (100) comprising two tubing components (120) attached to the anchor components (110) and three elastic cords (130). In the aforementioned embodiment, the third elastic cord (133) may comprise a first end that directly or indirectly (e.g., via an attachment component) connects to the anchor component (110) and a second end that directly or indirectly (e.g., via an attachment component) connects to a shoe of a user, e.g., at the distal end of the shoe at or near the toe box. In other embodiments, the third elastic cord (133) may comprise a first end that directly or indirectly (e.g., via an attachment component) connects to the anchor component (110) and a second end that directly or indirectly connects to the anchor component (110), wherein a medial portion of the third cord (133) passes through a portion of a shoe, e.g., an eyelet of the shoe, or fastener, or other attachment components at the distal end of the shoe at or near the toe box. FIG. 1C shows a limb assistance device (100) comprising three tubing components (120) attached to the anchor components (110) and three elastic cords (130) disposed through a portion of the tubing components (120). FIG. 1D shows a limb assistance device (100) comprising four tubing components (120) attached to the anchor components (110) and four elastic cords (130) disposed through a portion of the tubing components (120).

Figure 1A:
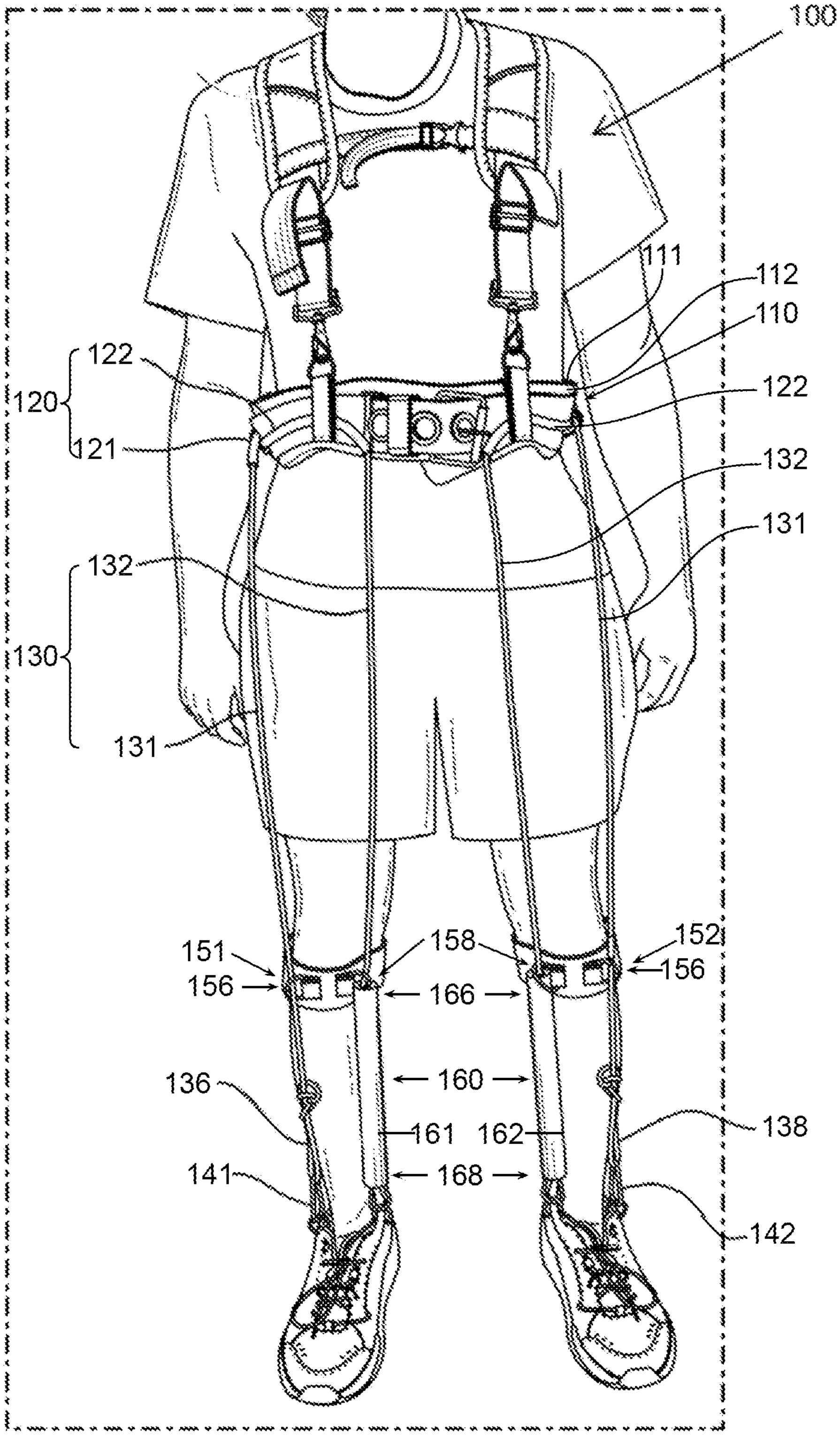
Figure 1B:
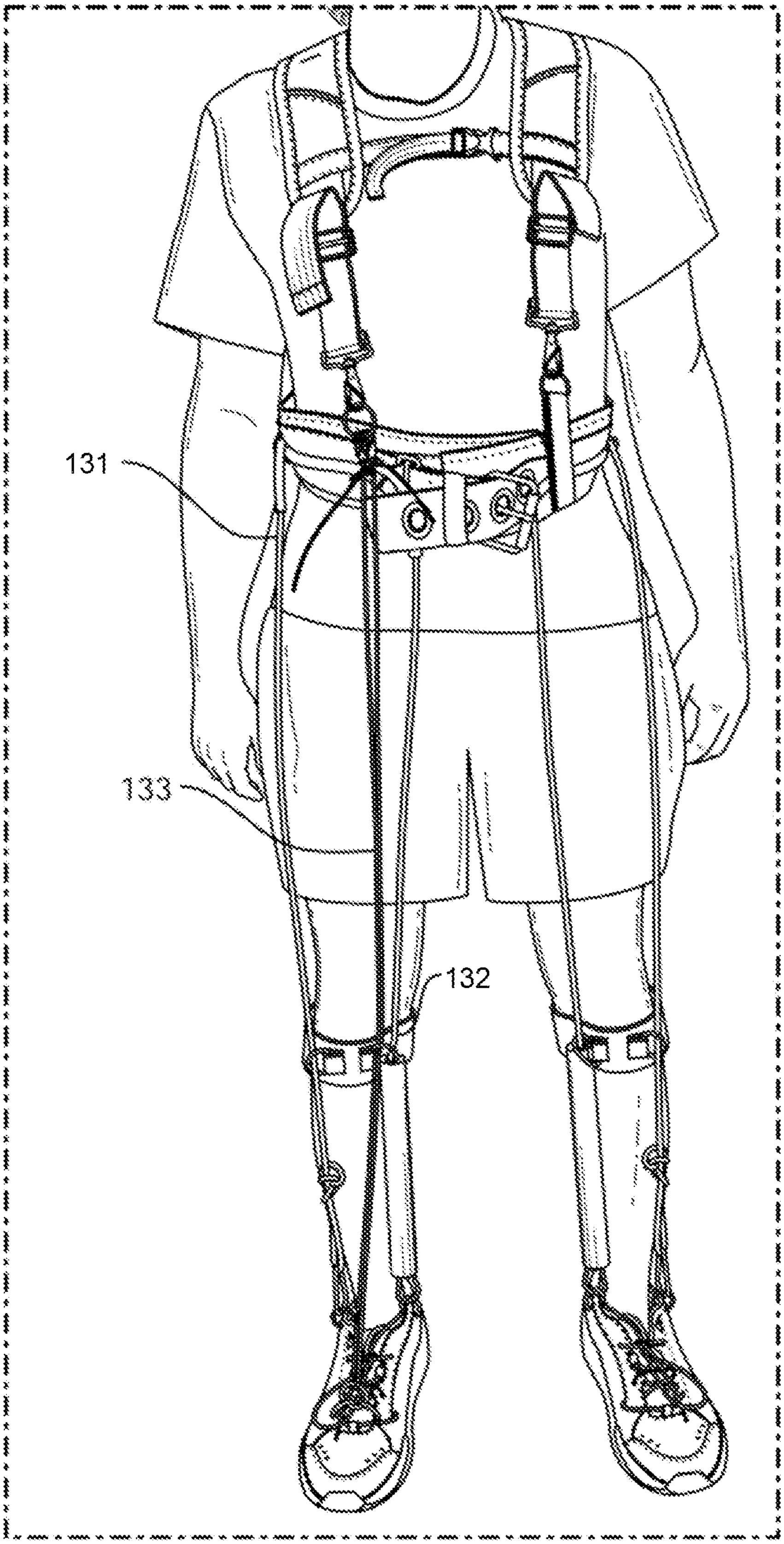
Figure 1C:
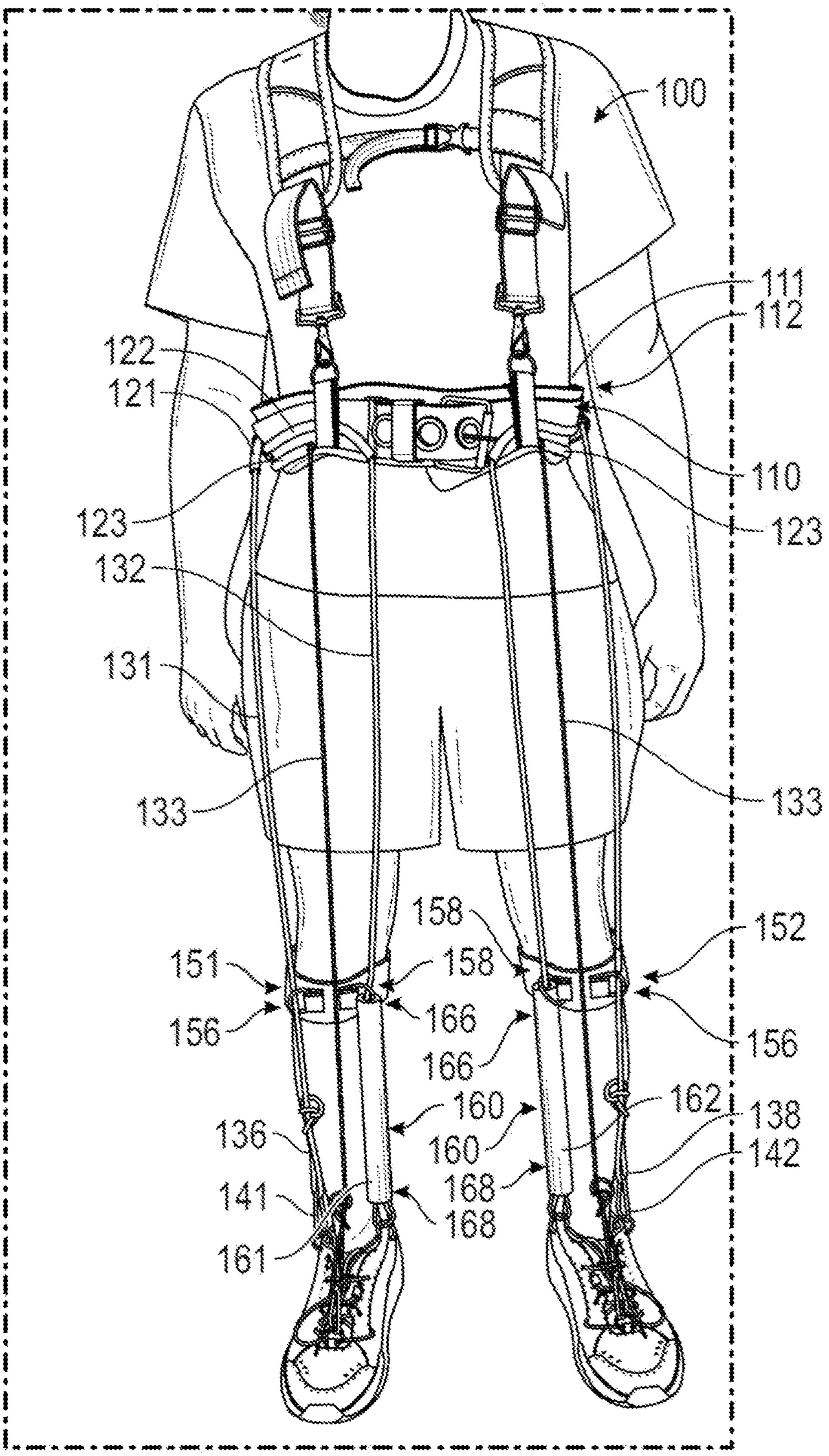
Figure 1D:
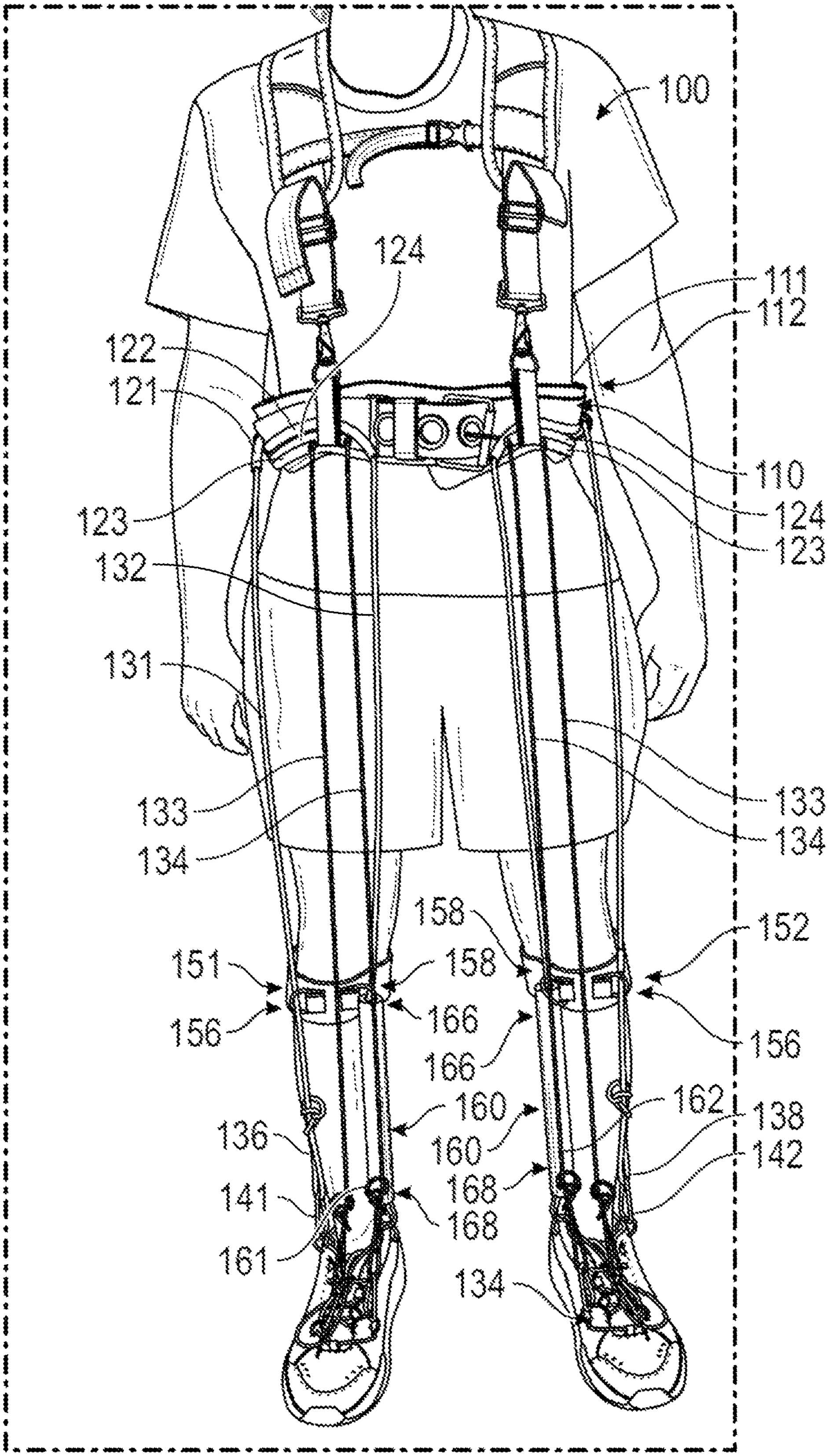
Figure 2B:
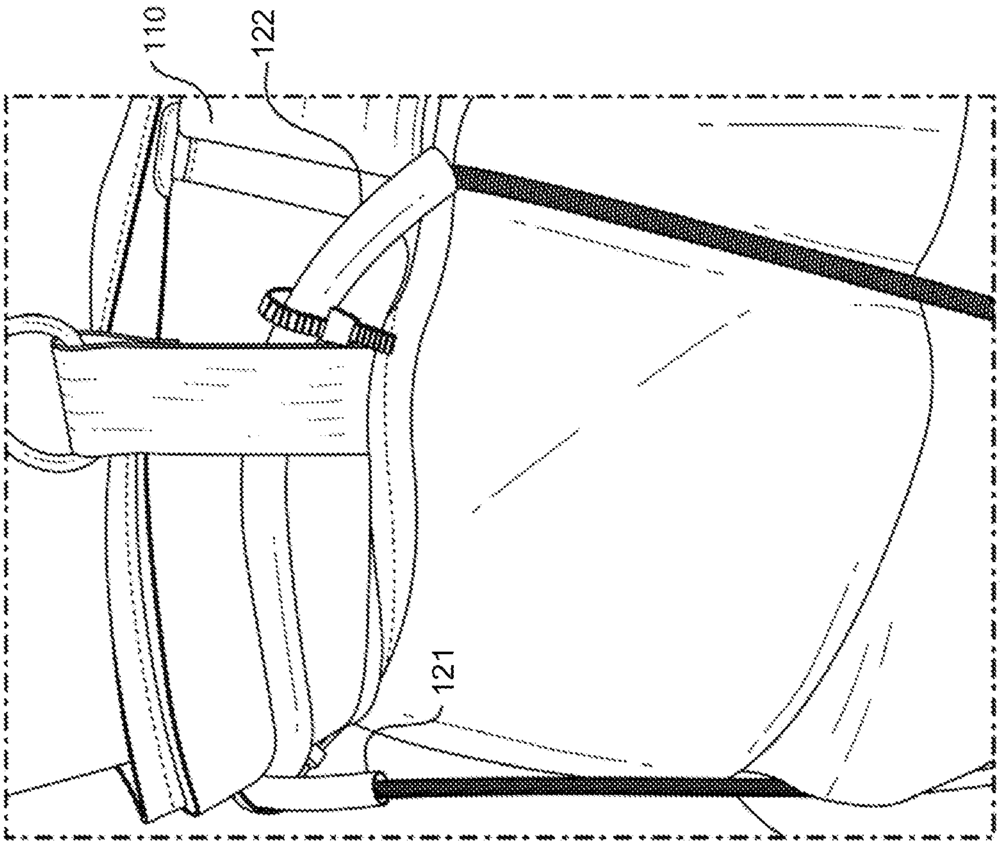
FIGS. 2A and 2B shows close-up side views of the harness portion of the limb assistance device of the present invention.
Figure 2A:
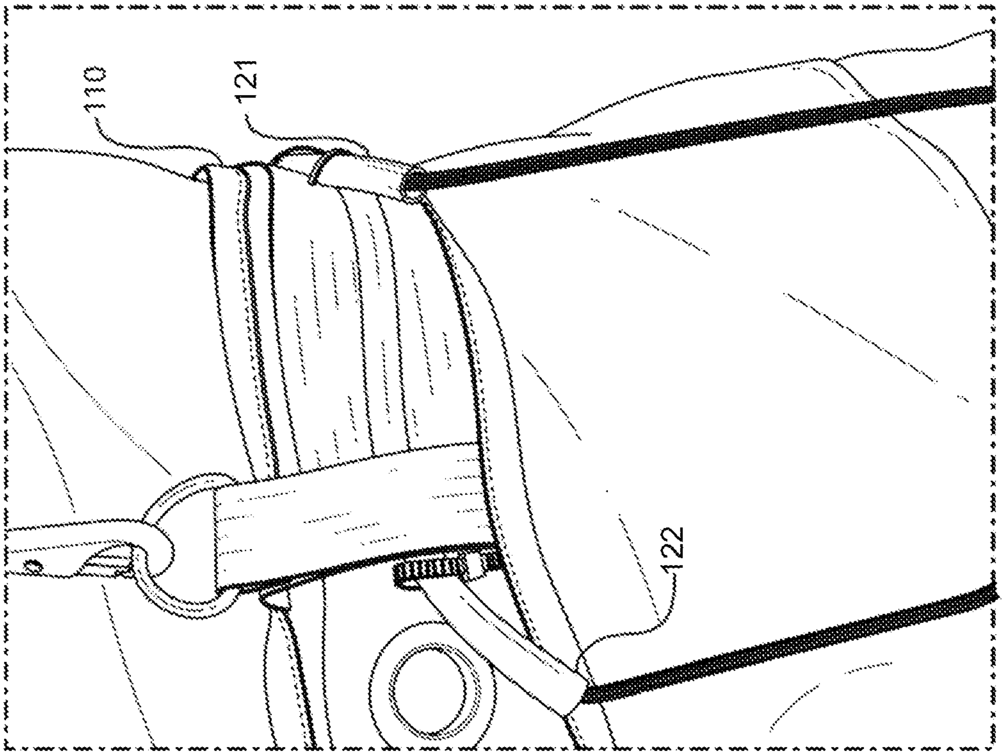
Figure 3:
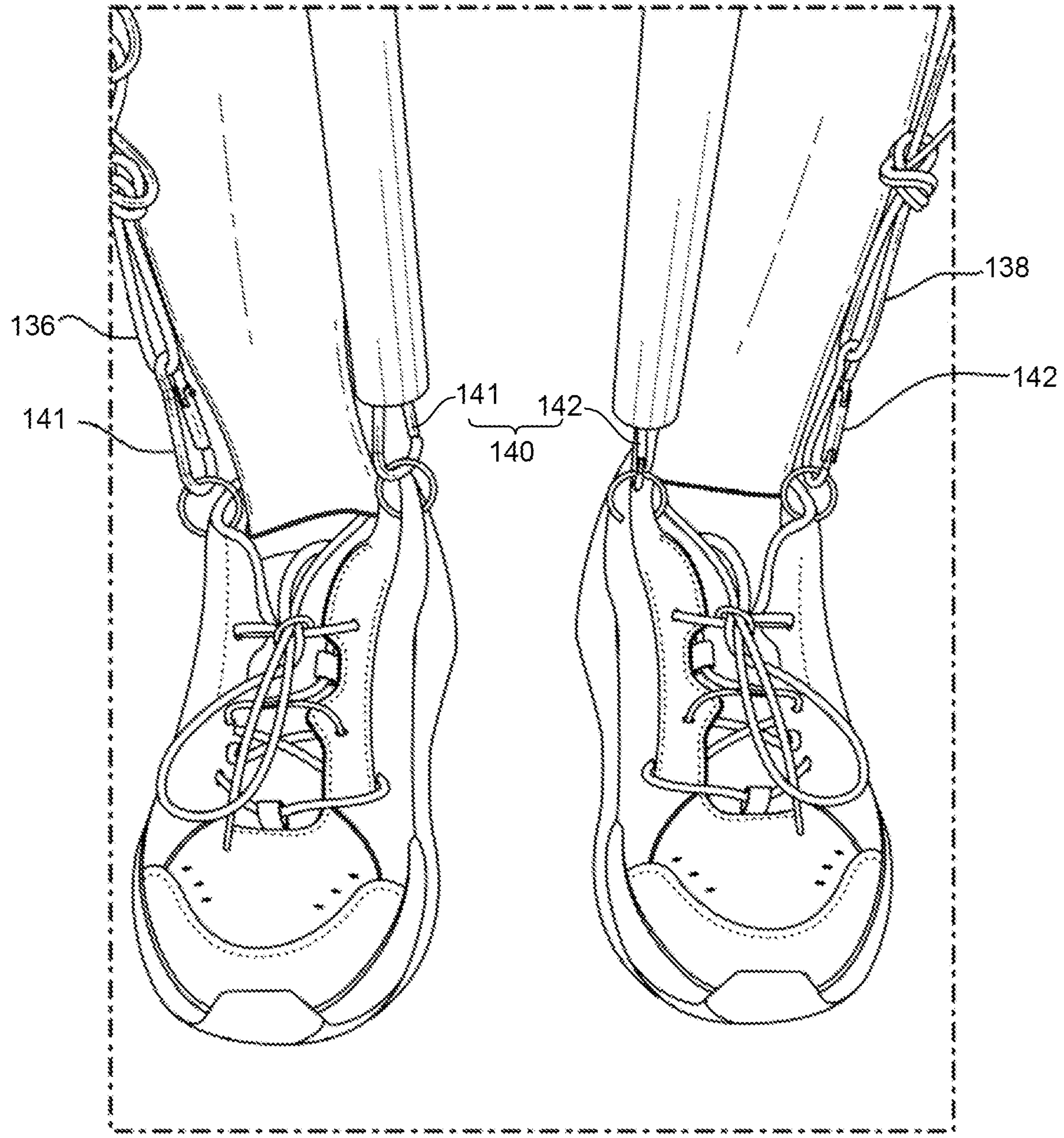
FIG. 3 shows a close-up view of the connection between the limb assistance device of the present invention and the user's shoes.
Figure 4B:
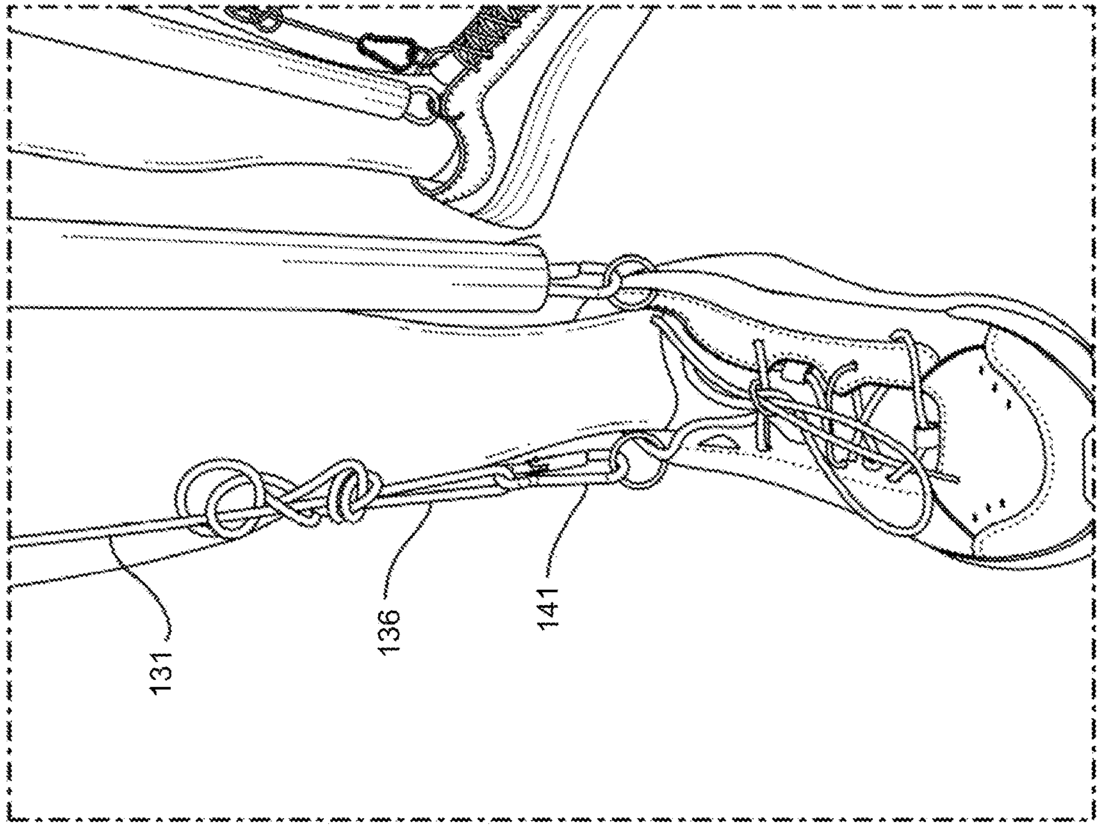
Figure 4A:
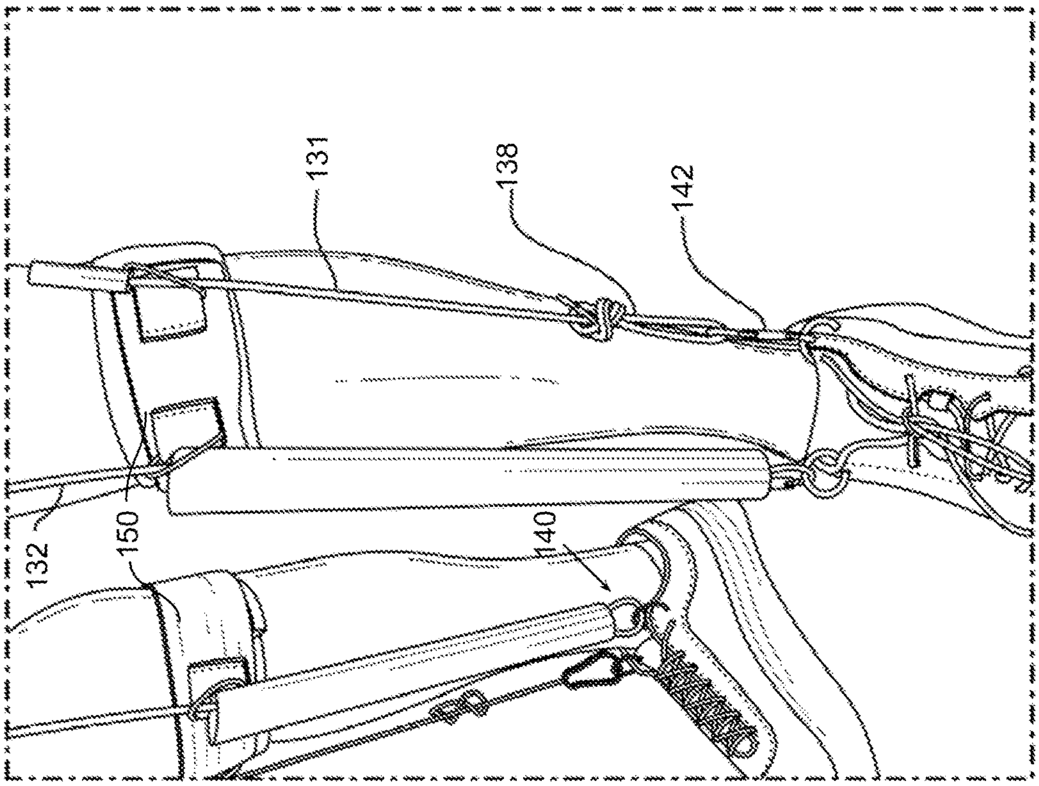
Figure 4C:
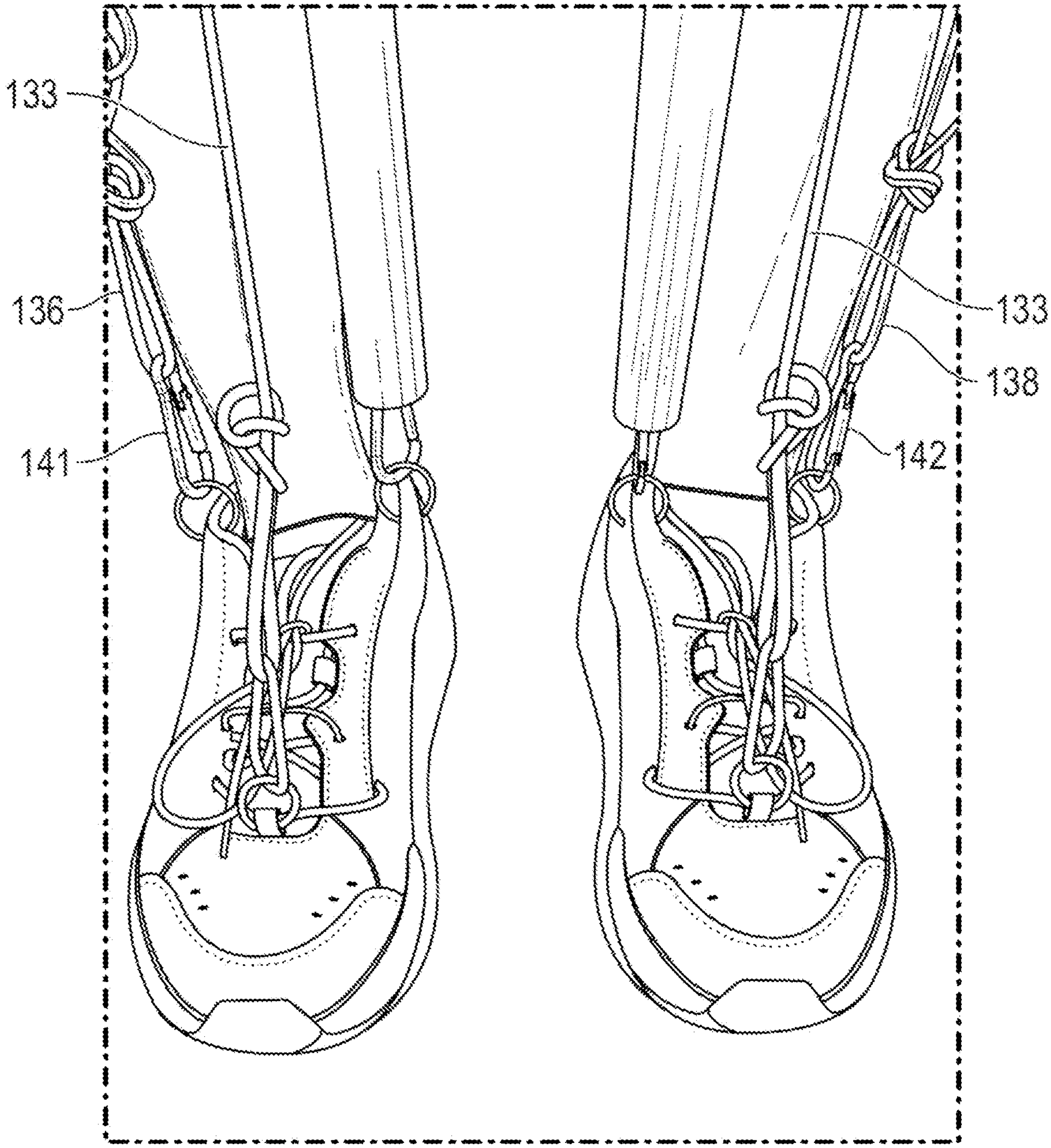
Figure 4D:
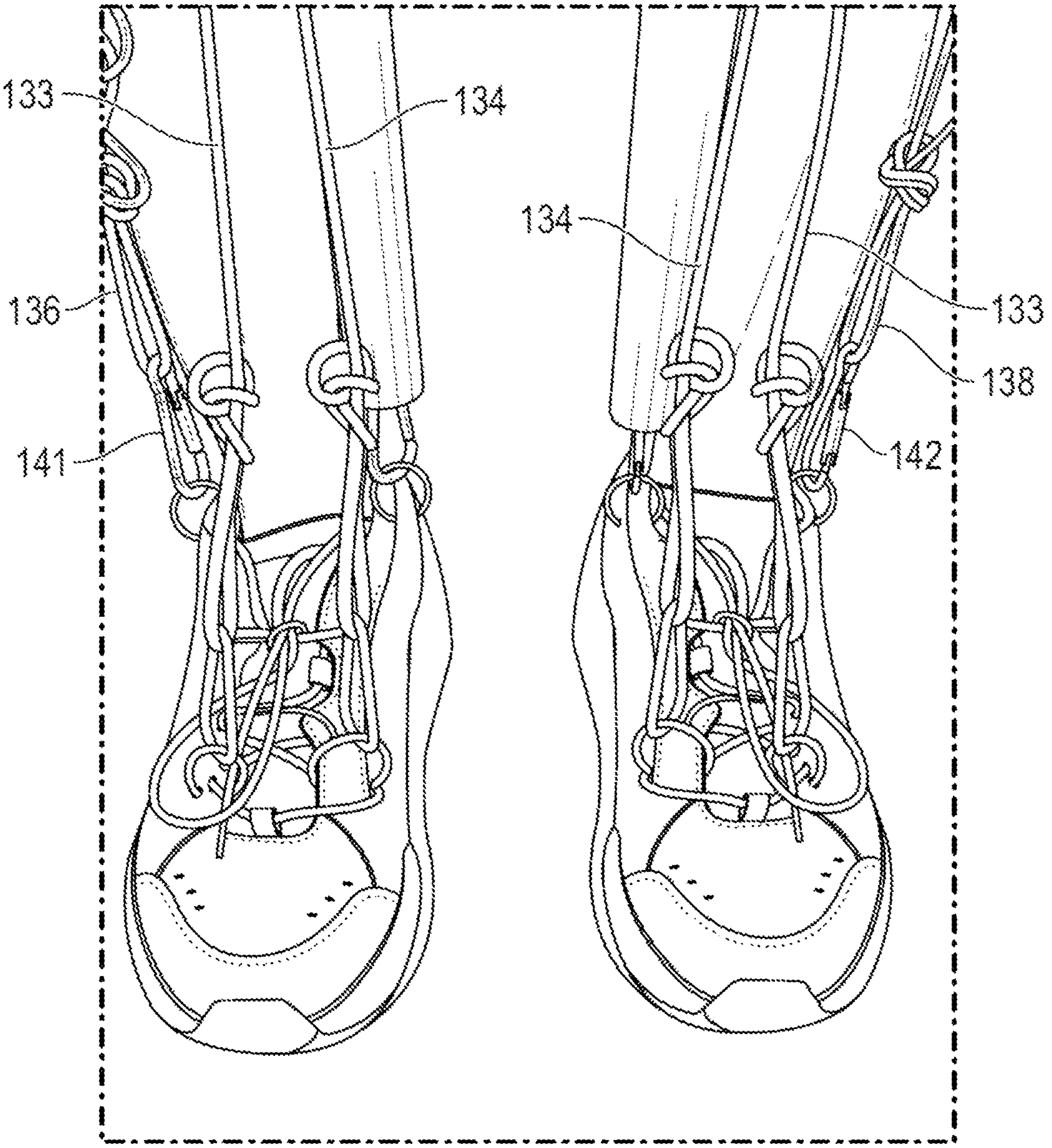
Figure 5A:
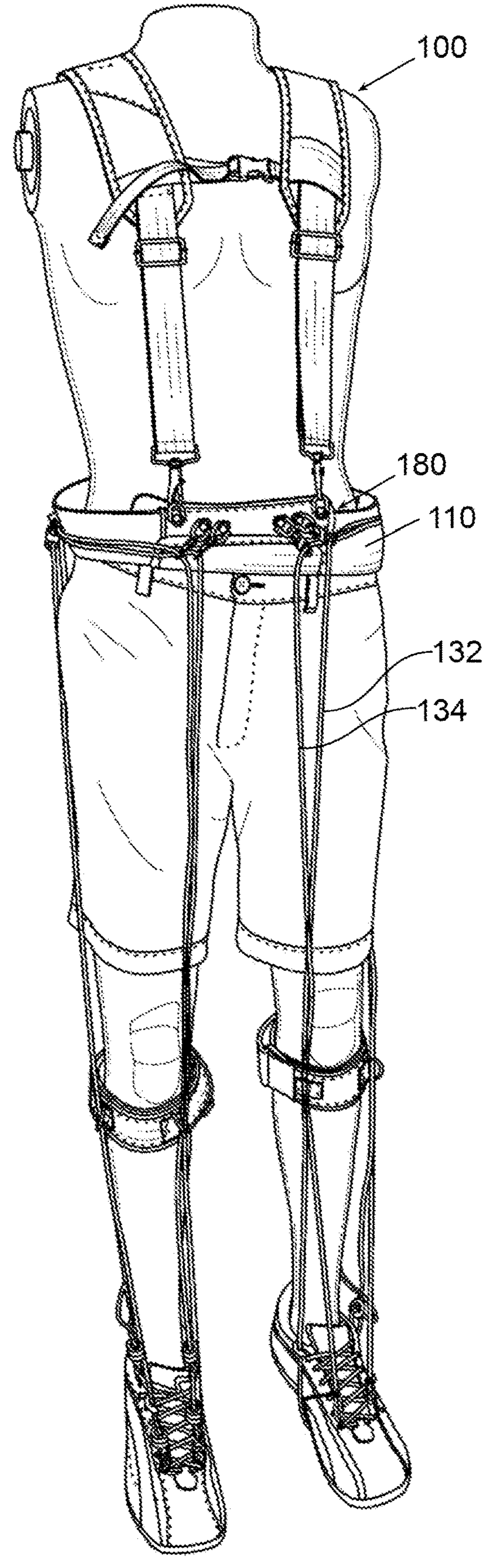
Figure 5B:
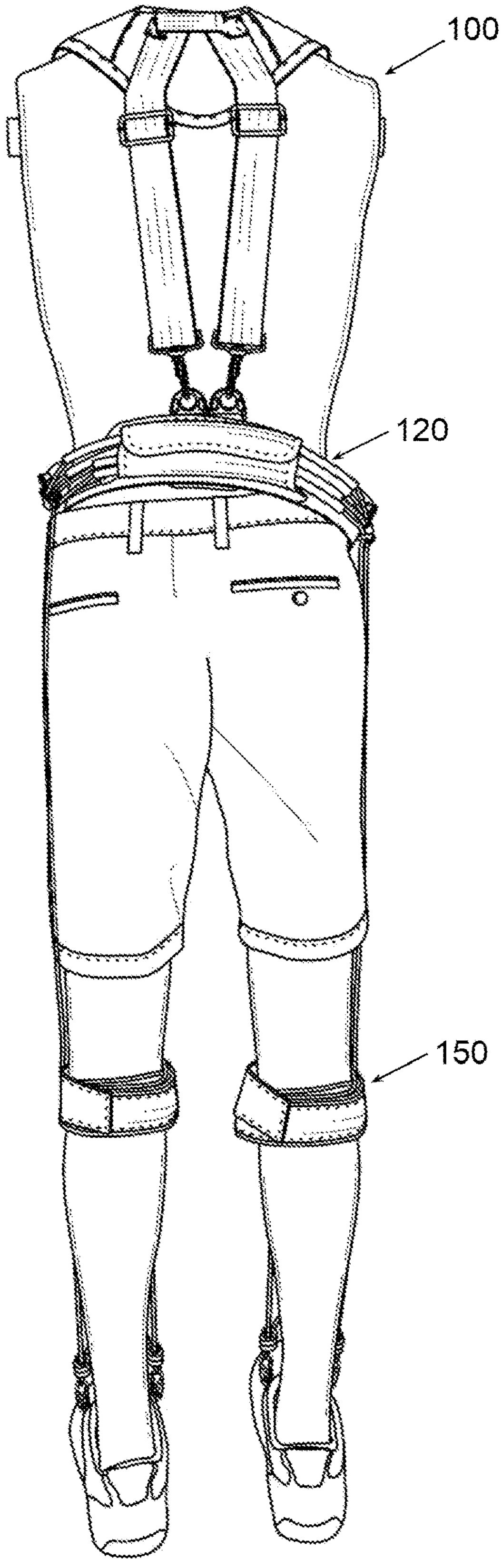
Figure 5C:
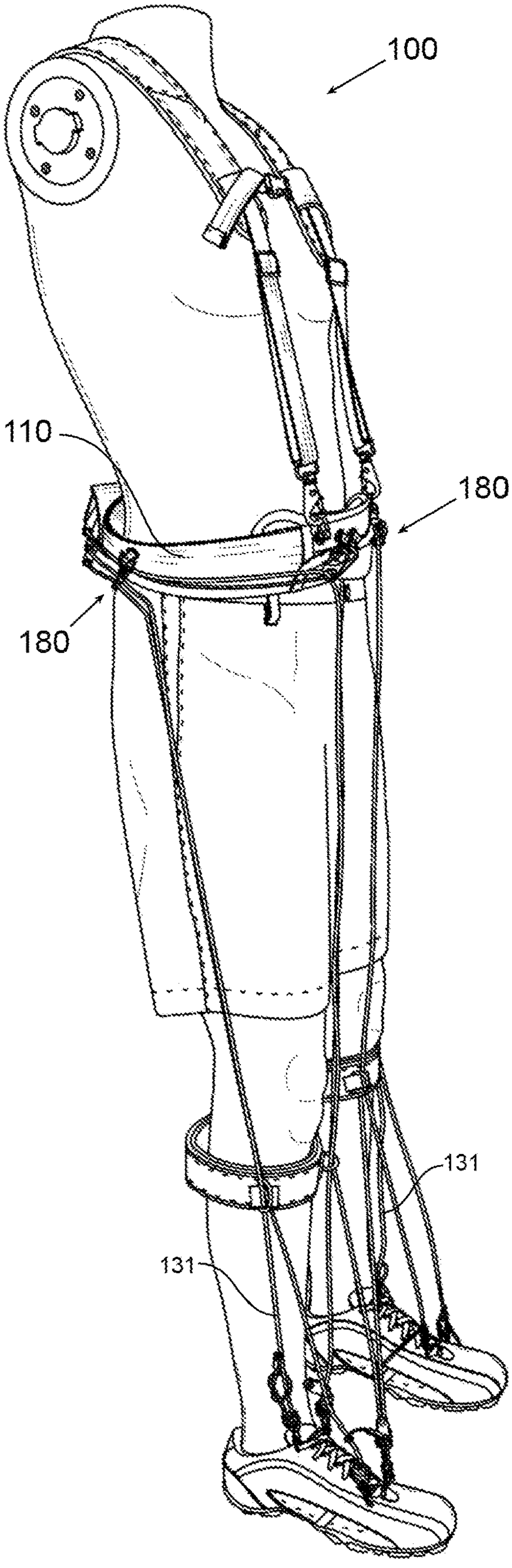

FIGS. 4A, 4B, 4C, and 4D shows a close-up view of a non-limiting example of how the limb assistance device (100) connected to the user's shoes. FIGS. 4A and 4B shows a limb assistance device (100) comprising two cords attached to the shoe of a user. FIG. 4C shows a limb assistance device (100) comprising three cords attached to the shoe of a user. FIG. 4D shows a limb assistance device (100) comprising four cords attached to the shoe of a user FIGS. 5A, 5B, and 5C show various views, e.g., front (FIG. 5A), back (FIG. 5C), and side (FIG. 5C), of an alternative embodiment of the limb assistance device (100) of the present invention comprising four tubing components (120) attached to the anchor components (110) and four elastic cords (130) disposed through a portion of the tubing components (120).

Figure 6A:
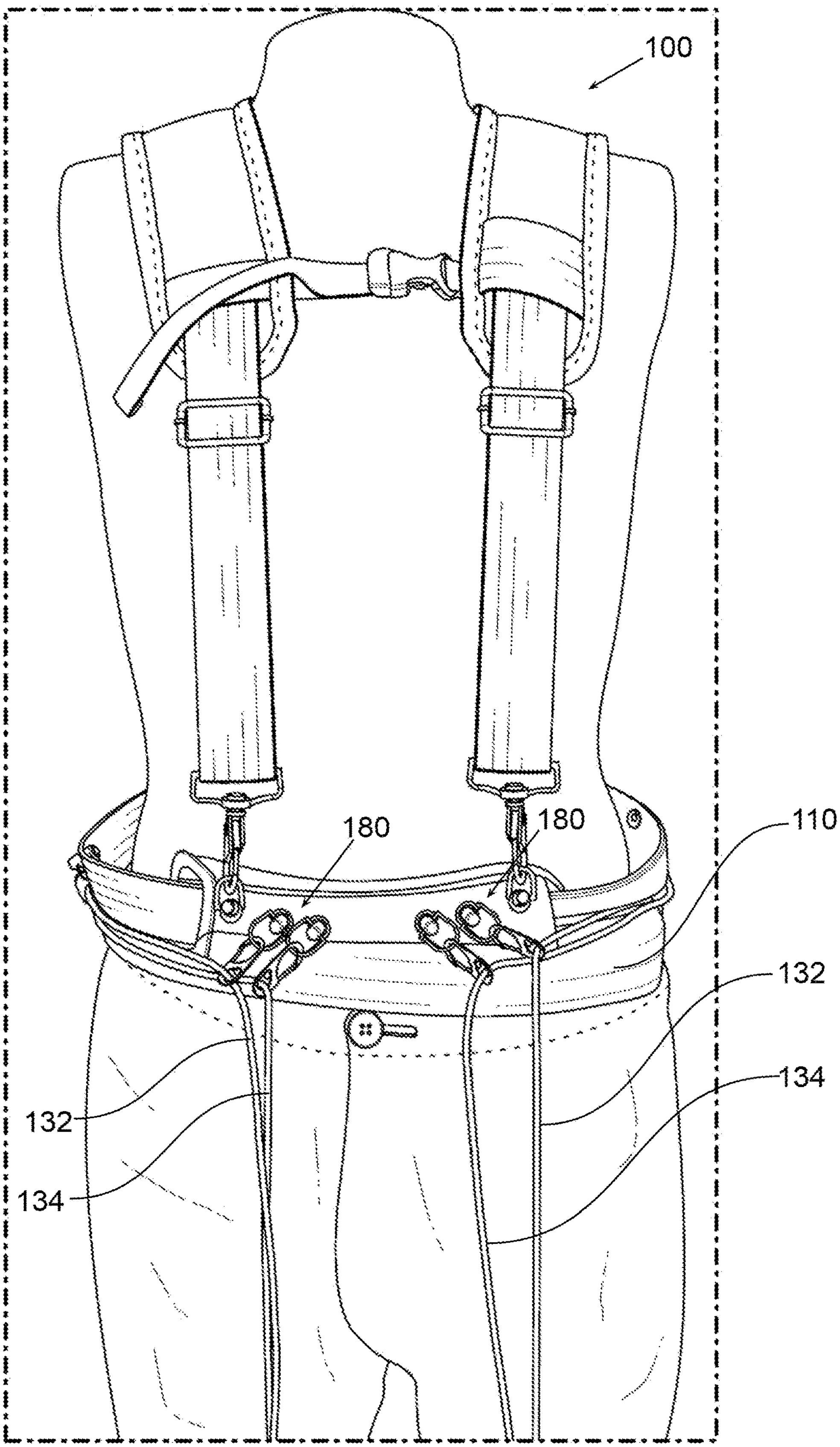
Figure 6B:
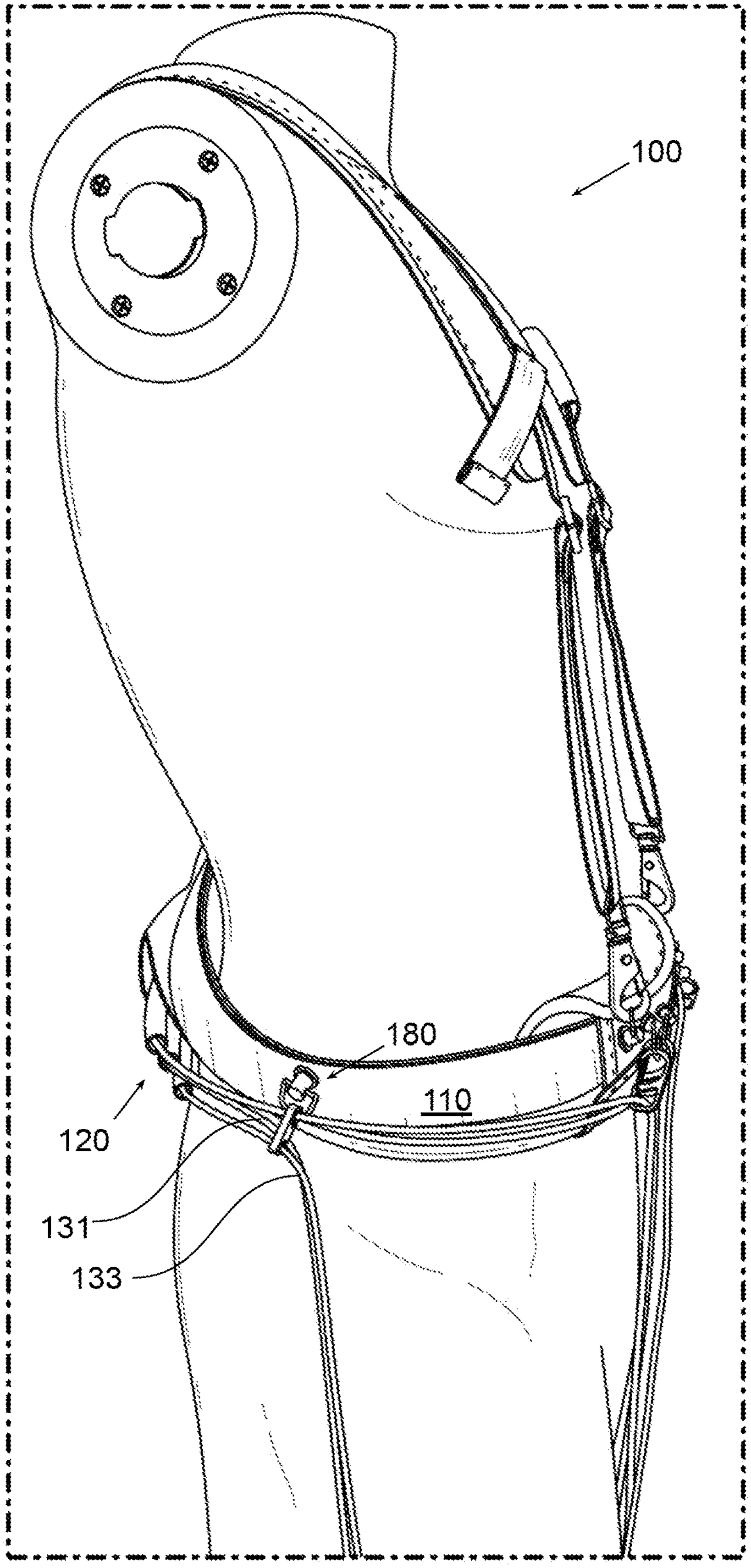
Figure 6C:
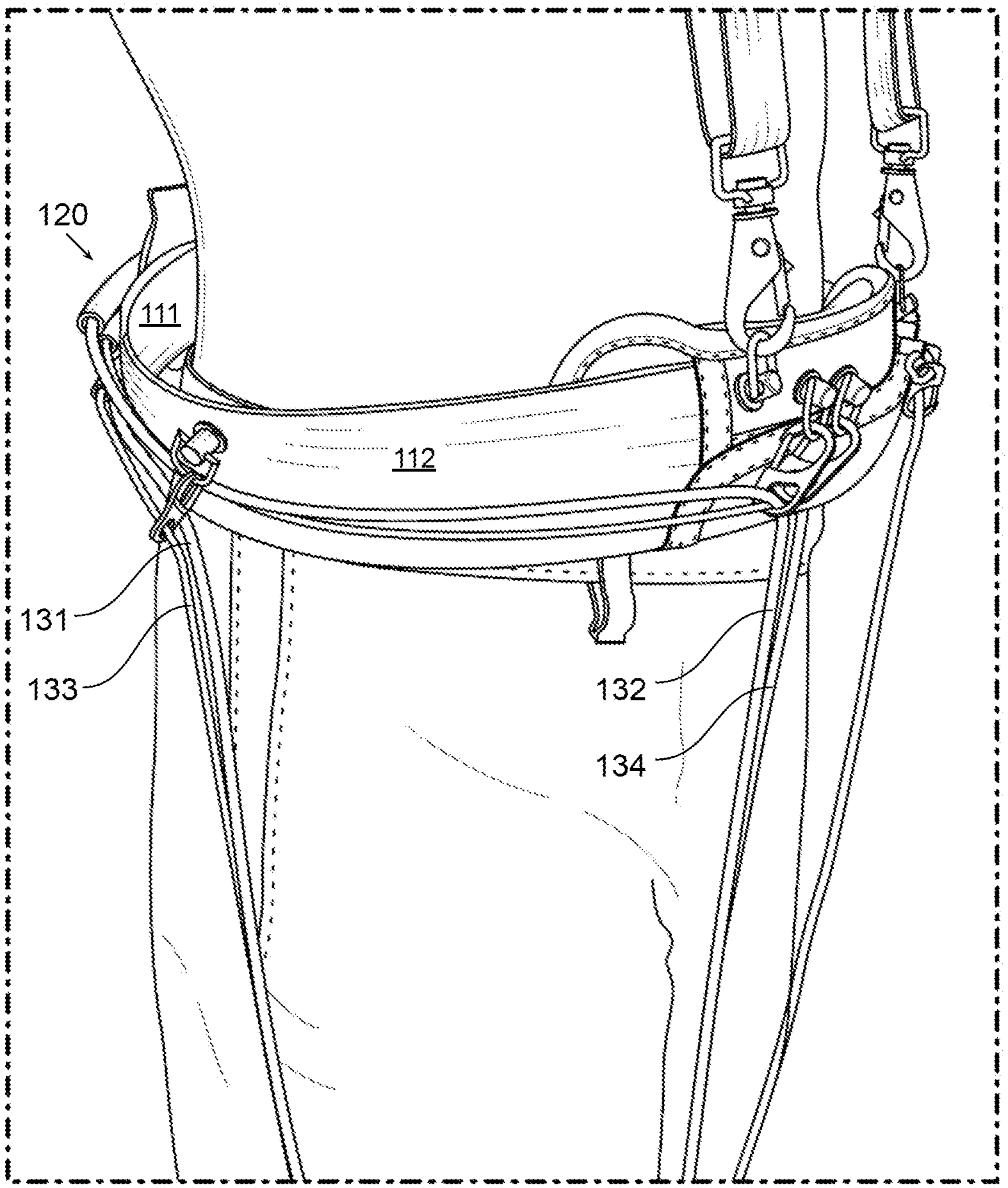
Figure 7A:
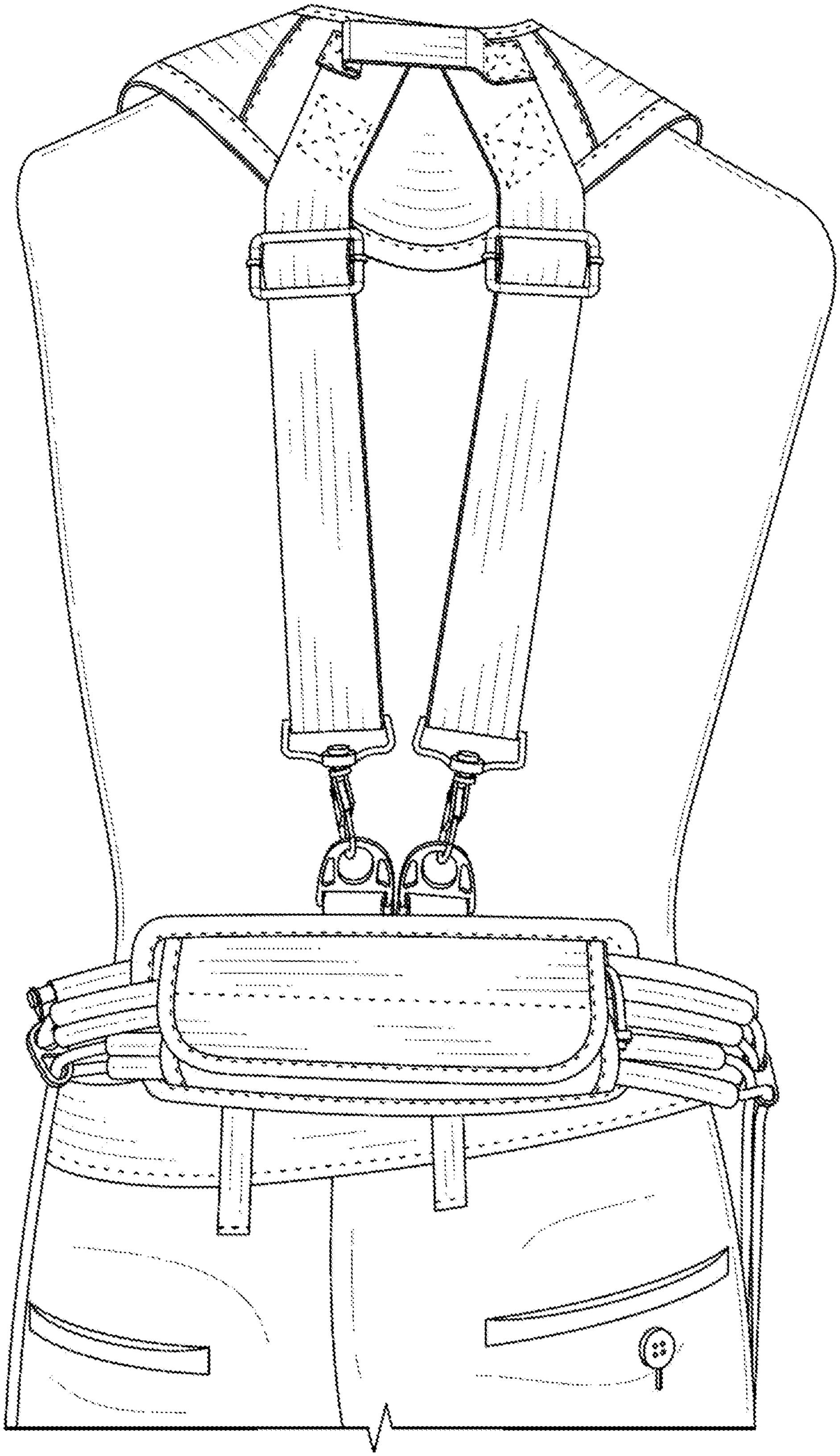
Figure 7B:
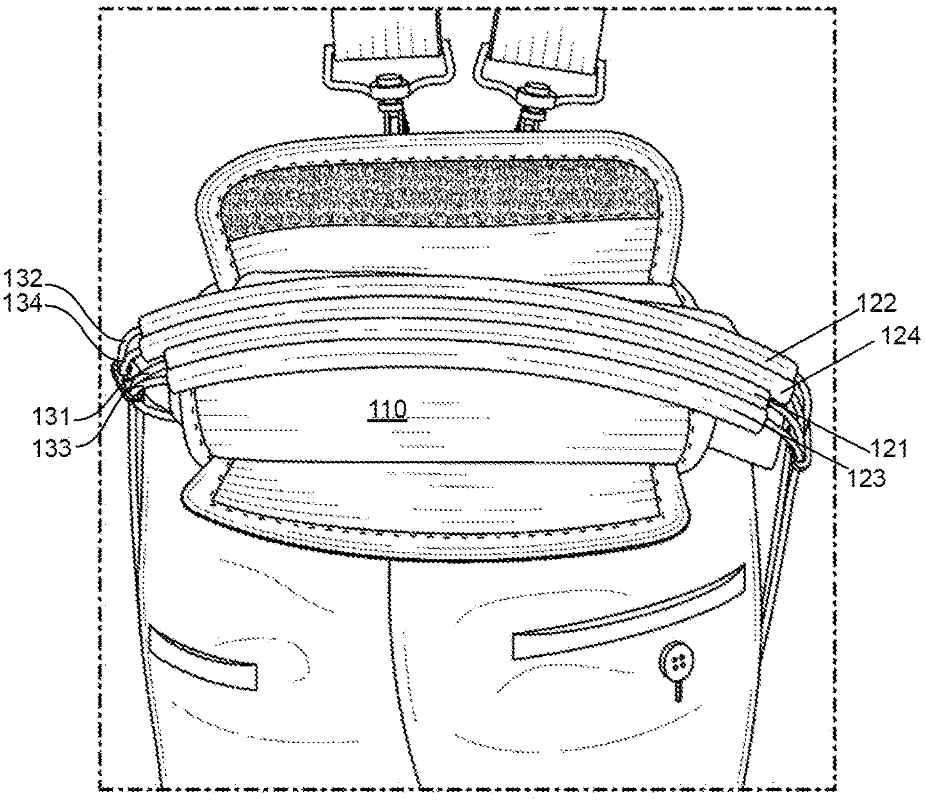
Figure 7C:
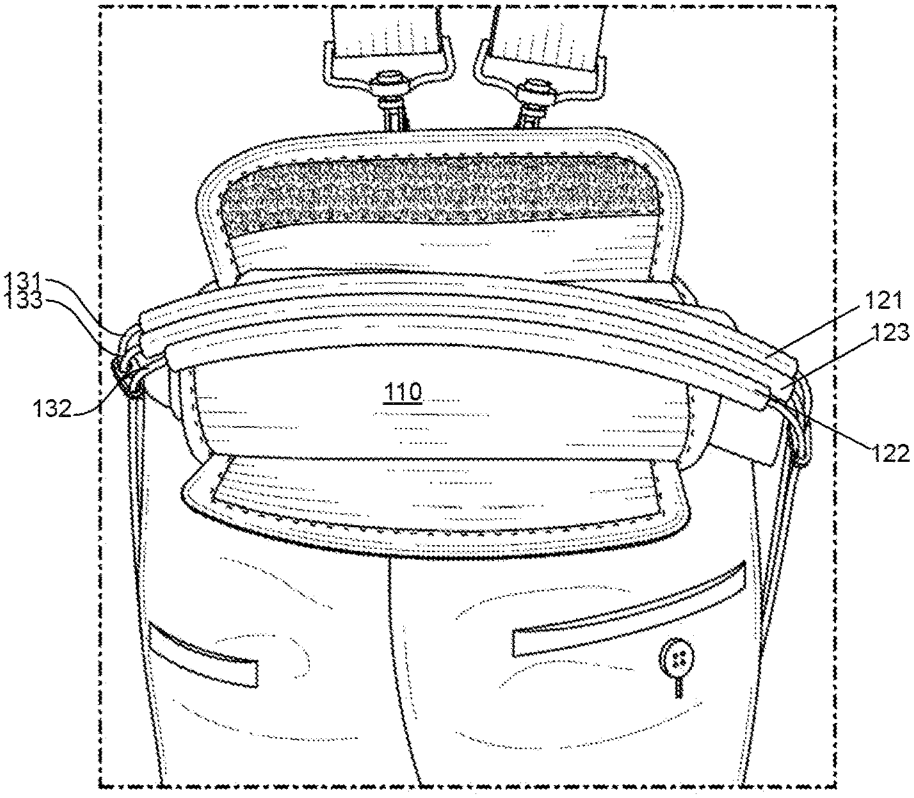
Figure 7D:
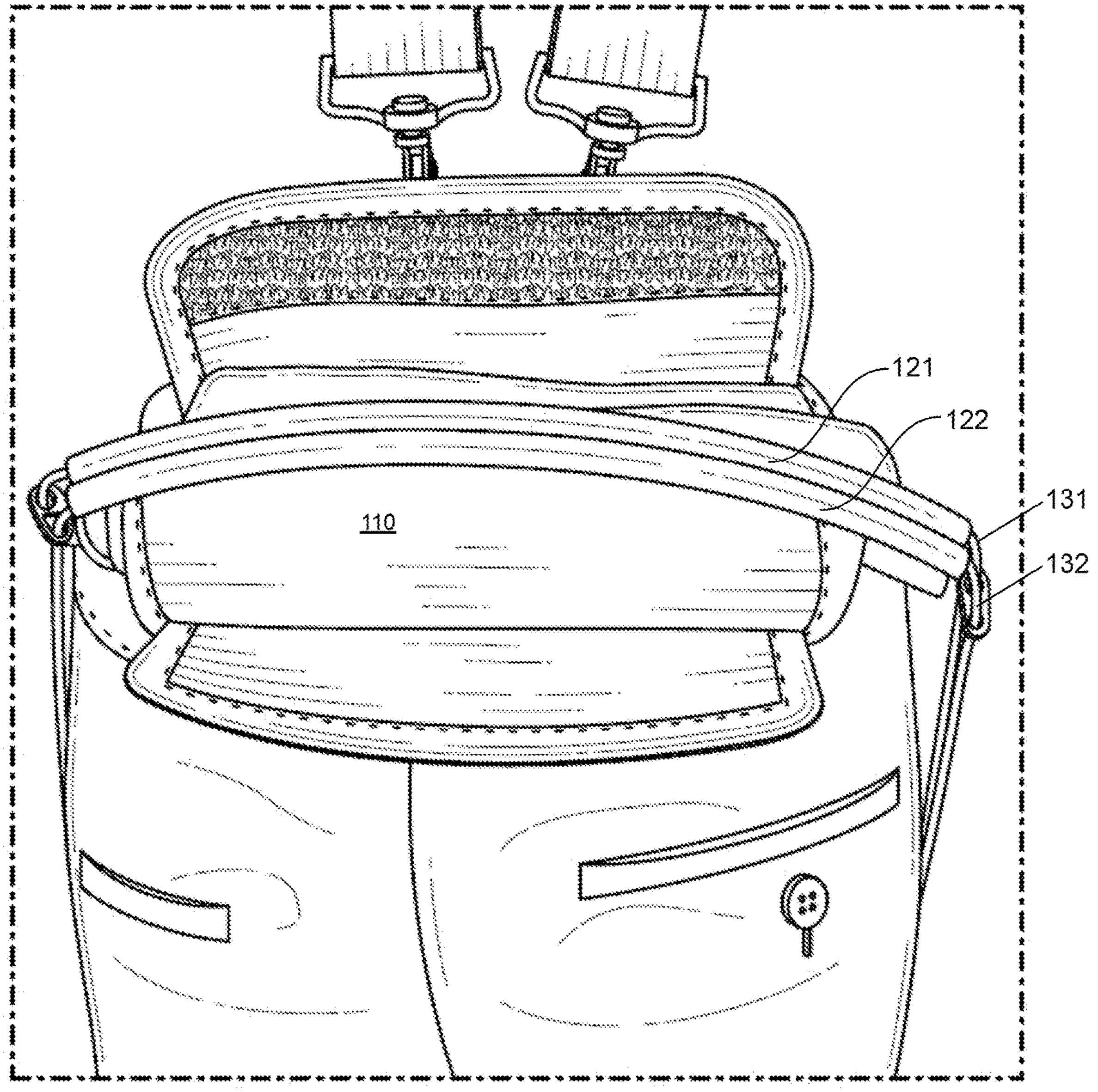

FIGS. 6A, 6B, and 6C shows various non-limiting views, e.g., front (FIG. 6A) and side (FIGS. 6B and 6C) of the anchor component (100).

FIGS. 7A, 7B, 7C, and 7D shows back views of the limb assistance device (100) described herein.

Figure 8:
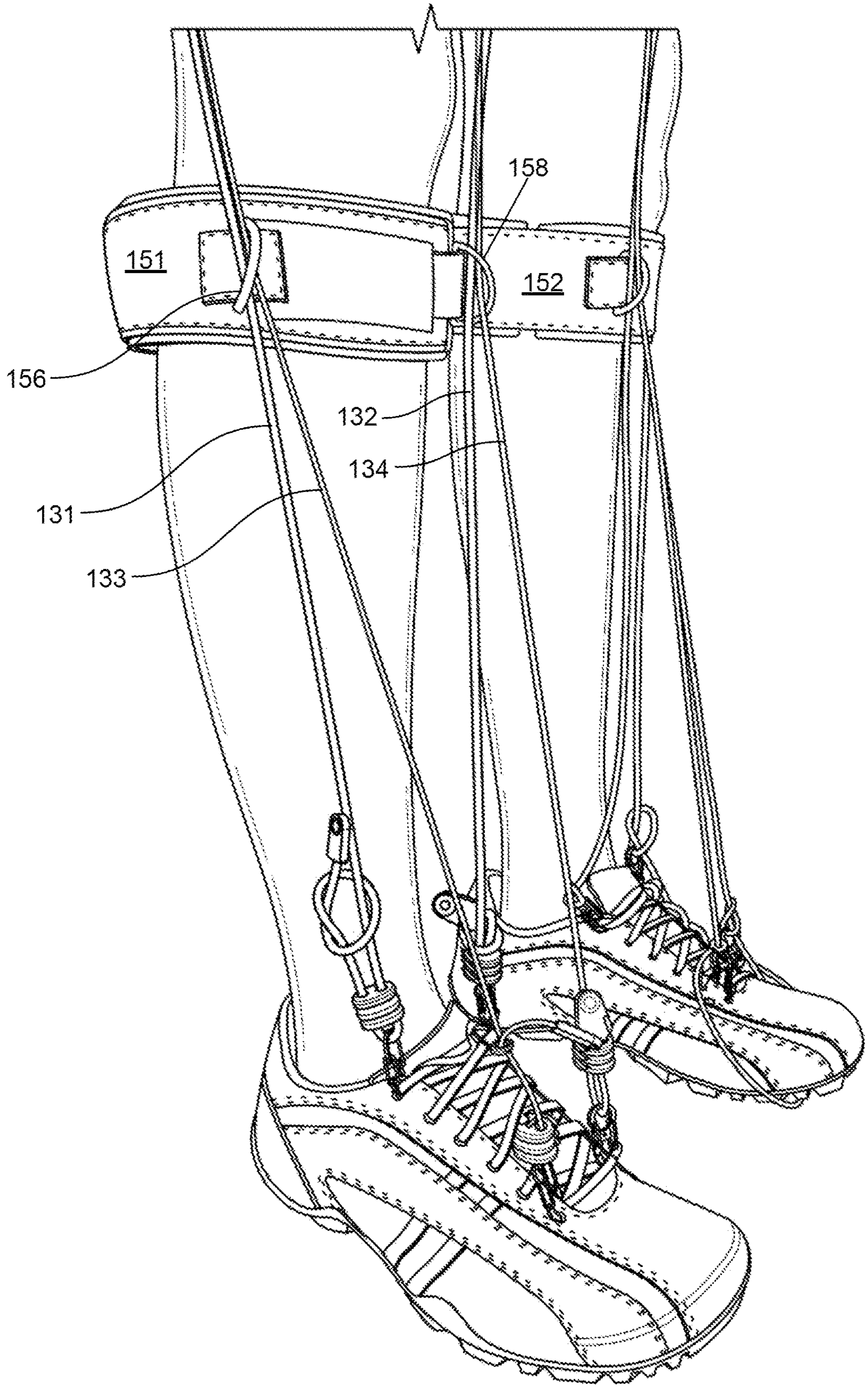

FIG. 8 shows a close-up view of a lower portion of the limb assistance device (100) described herein.

Figure 9A:
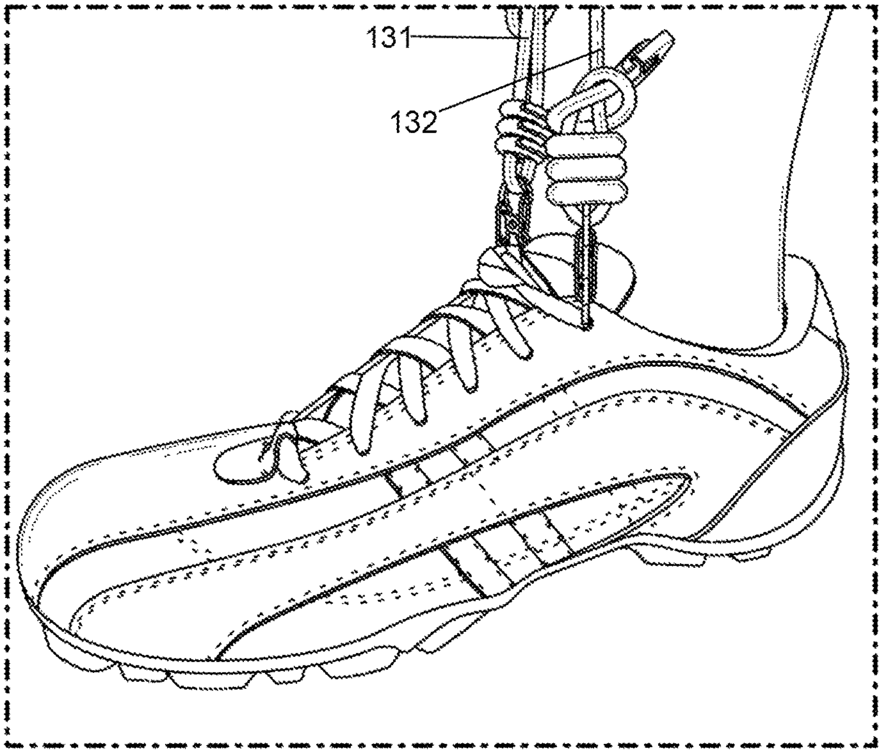
Figure 9B:
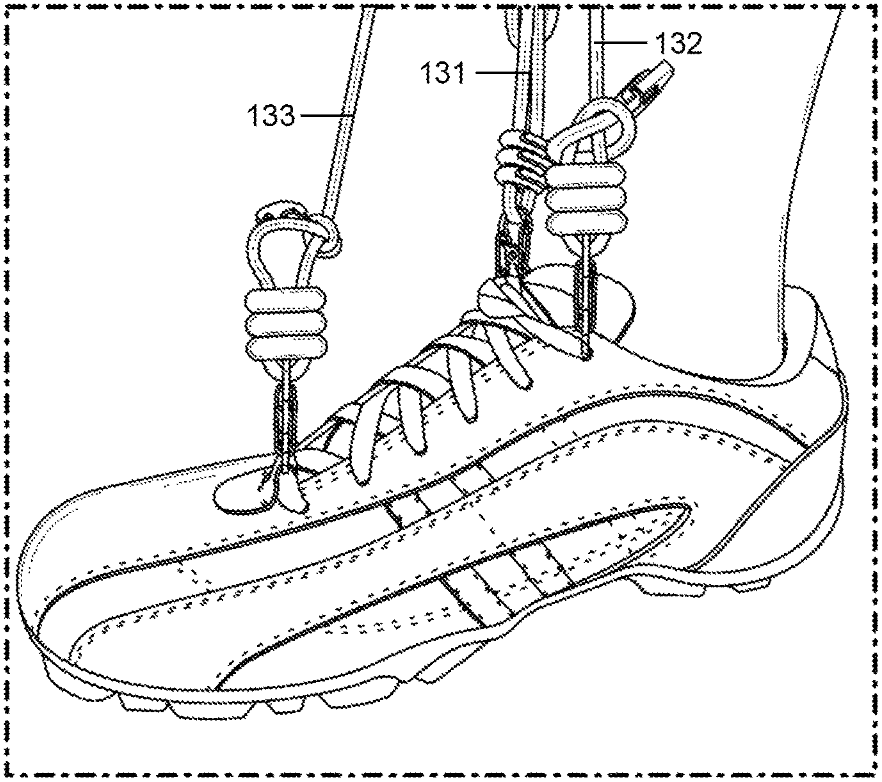
Figure 9C:
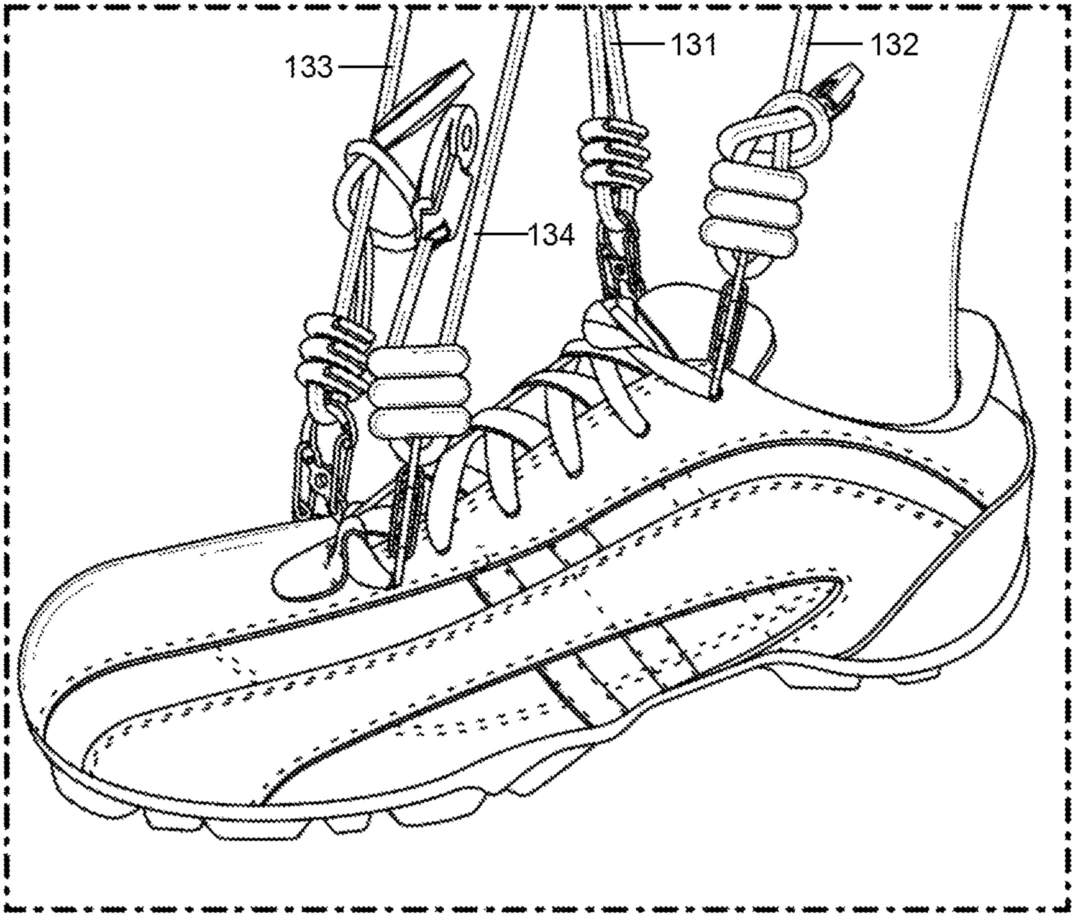
Figure 10A:
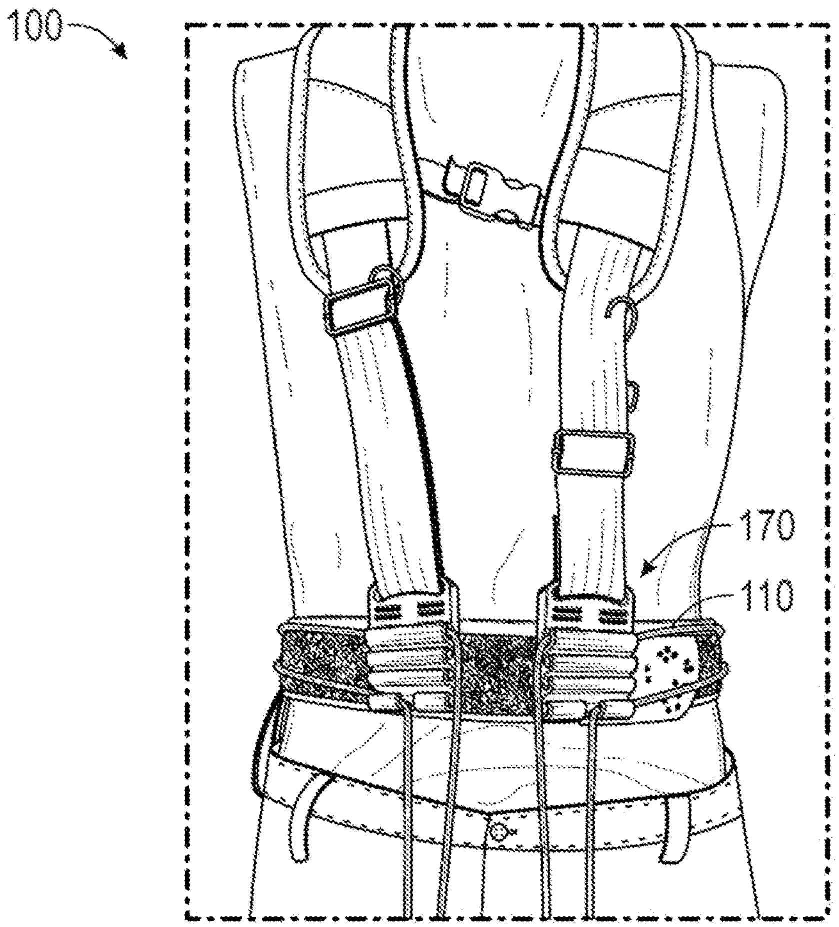
Figure 10B:
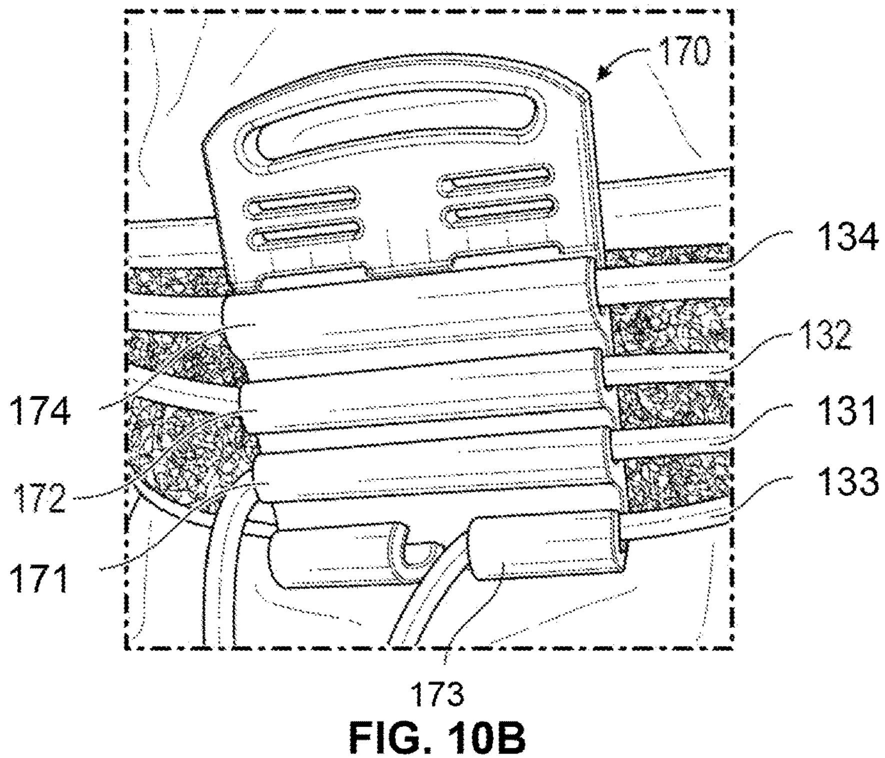
Figure 10C:
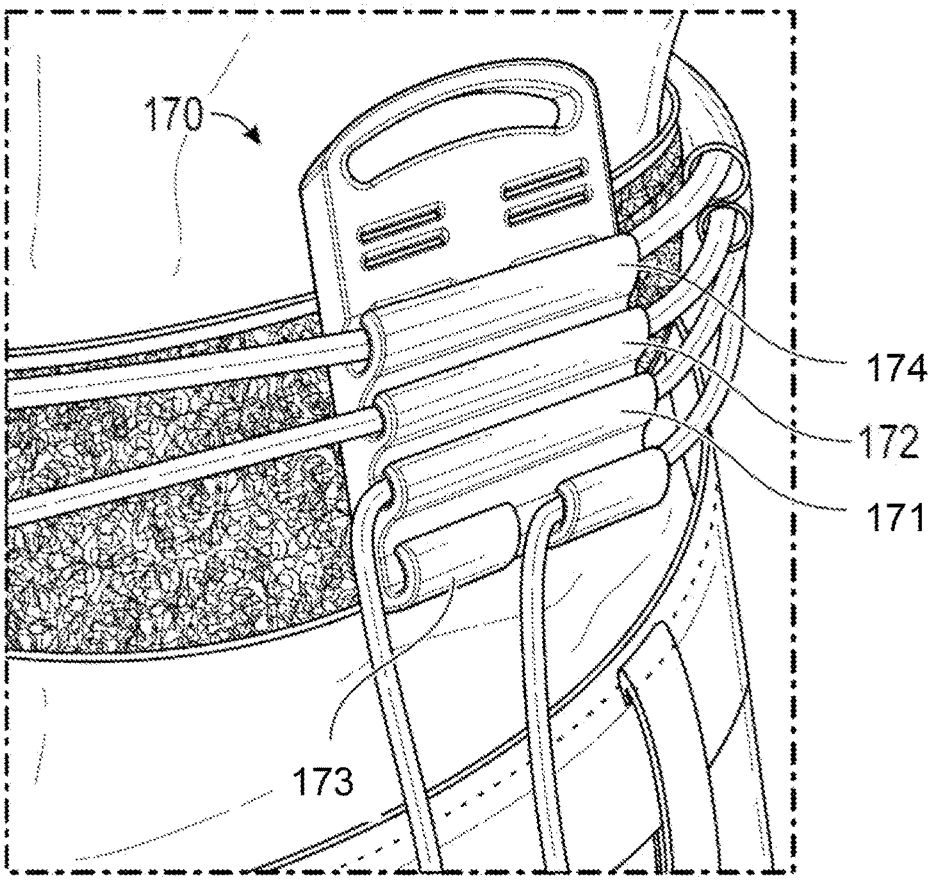
Figure 10D:
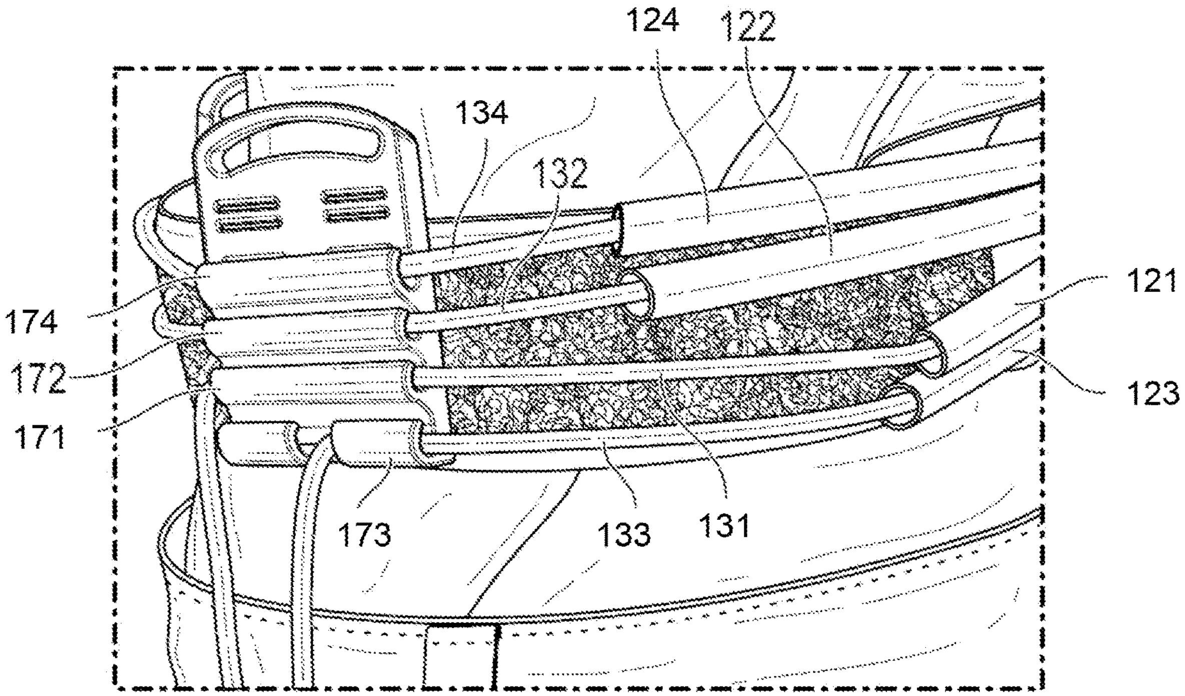
Figure 10E:
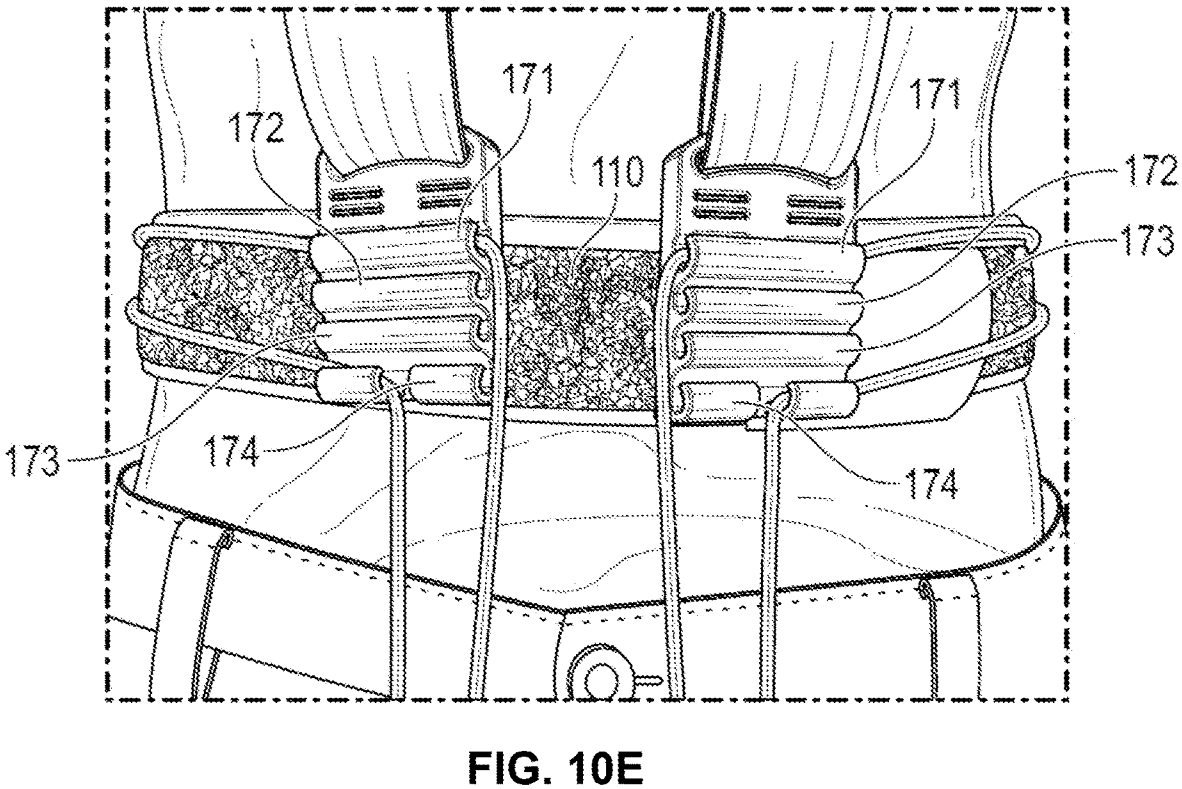
Figure 10F:
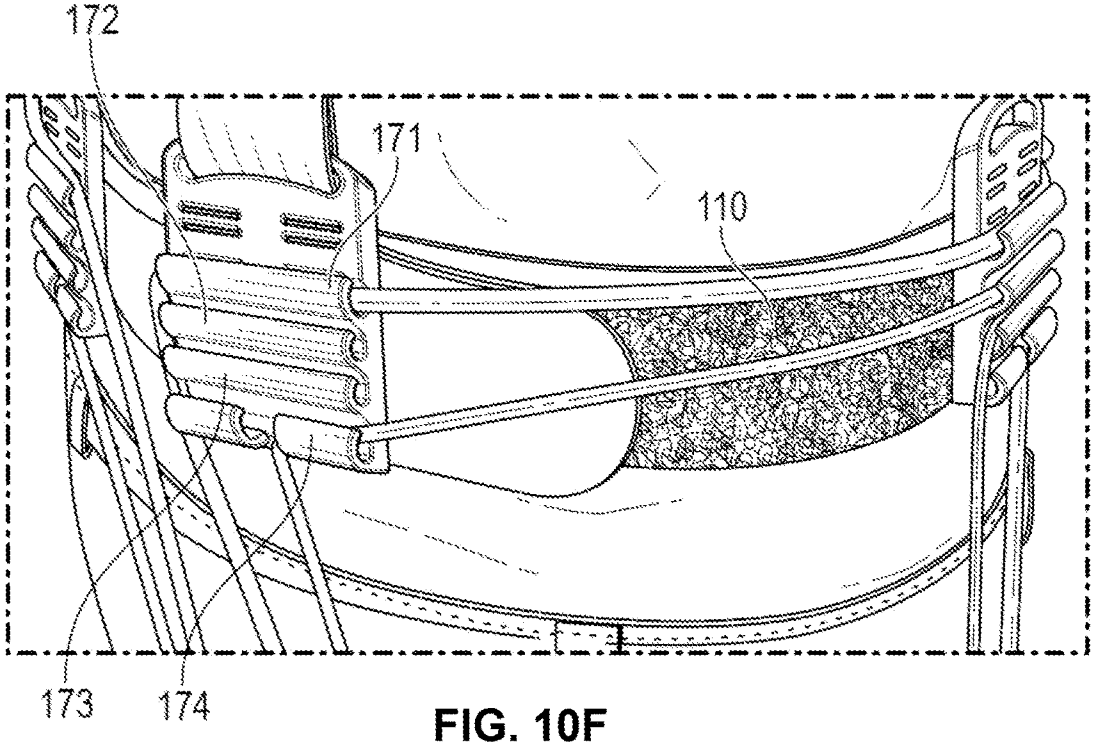

FIGS. 9A, 9B, and 9C shows non-limiting examples of how a limb assistance device (100) may be attached to the shoe of a user using two cords (FIG. 9A), three cords (FIG. 9B), or four cords (FIG. 9C).

FIGS. 10A, 10B, 10C, 10D, 10E, and 10F show various views of an alternative embodiment of the limb assistance device (100) of the present invention comprising one or more channel components (170) disposed on the anchor component (110).

Figure 11:
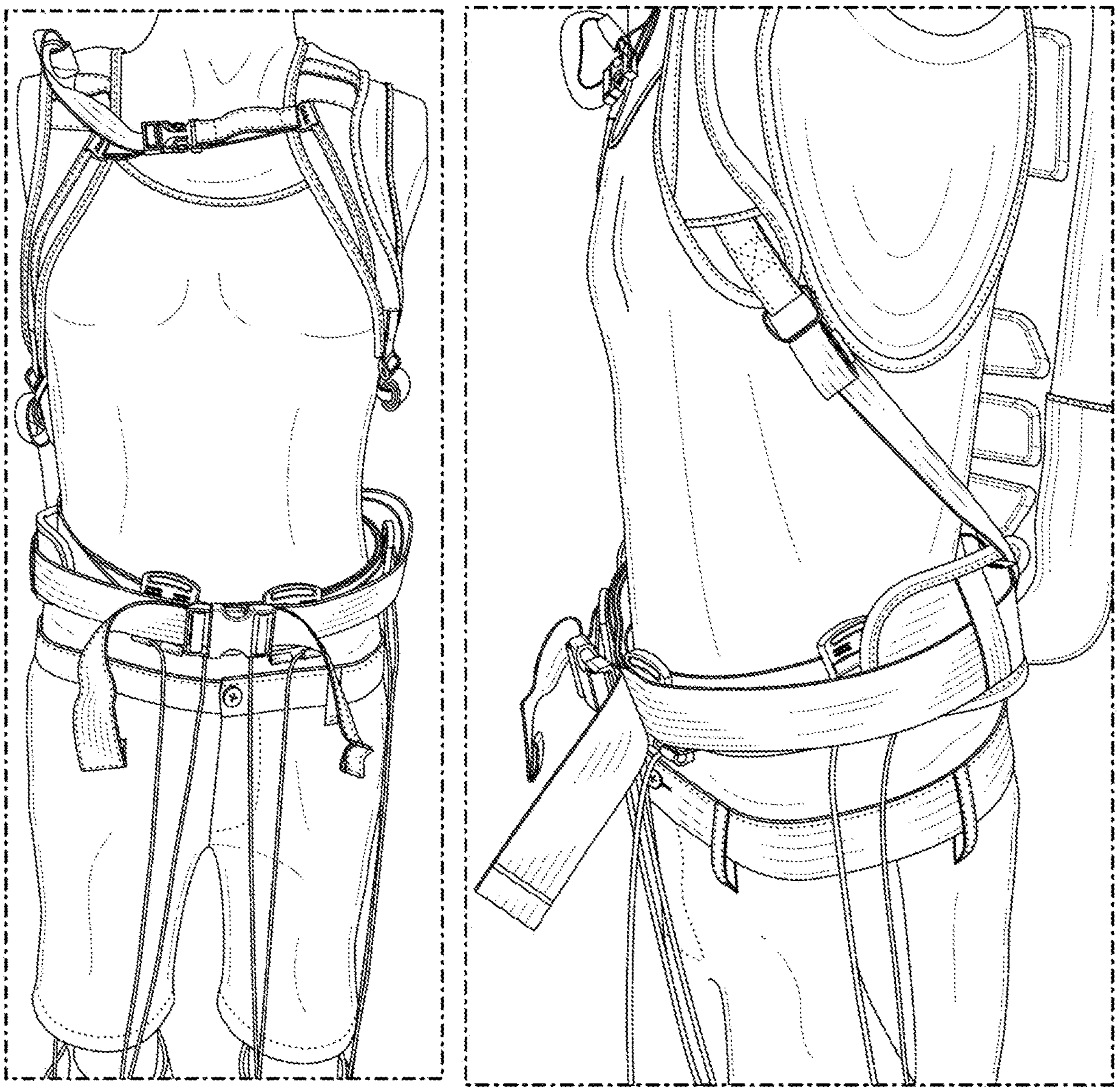

FIG. 11 shows an embodiment of the wearable devices described herein incorporated into a backpack.

DETAILED DESCRIPTION OF THE INVENTION

The following is a list of elements corresponding to a particular element referred to herein:

100 Wearable Device
110 Anchor Component
111 Inner Surface
112 Outer Surface
120 Tubing Component
121 First Tubing Component
122 Second Tubing Component
123 Third Tubing Component
124 Fourth Tubing Component
130 Elastic Cord
131 First Elastic Cord
132 Second Elastic Cord
133 Third Elastic Cord
134 Fourth Elastic Cord
136 First Cord End
138 Second Cord End
140 Attachment Component
141 First Attachment Component
142 Second Attachment Component
150 Cuff
151 First Cuff
152 Second Cuff
156 First Guide
158 Second Guide
160 Elastic Cord Cover
161 First Elastic Cord Cover
162 Second Elastic Cord Cover
166 First Cover End
168 Second Cover End
170 Channel Component
171 First Channel
172 Second Channel
173 Third Channel
174 Fourth Channel
180 Coupling Component The present invention features a wearable device (100) for assisting in the movement of lower limbs (e.g., a leg and/or a foot). The device (100) may comprise an anchor component (110) configured to wrap around the torso of a user (e.g., configured to loosely wrap around the torso of a user), a first elastic cord (131), and a second elastic cord (132), both comprising a first cord end (136) and a second cord end (138), and a means for aligning the first elastic cord (131) and the second elastic cord (132) (e.g., an aligning component) such that the first elastic cord (131) is positioned to run laterally alongside a portion of a leg and the second elastic cord (132) is positioned to run medially alongside a portion of the leg. At least a portion of the first elastic cord (131) and the second elastic cord (132) is disposed on the anchor component (110).

The present invention features a wearable device (100) for assisting in the movement of lower limbs (e.g., a leg and/or a foot). The wearable device (100) may comprise an anchor component (110) configured to encircle a torso of a user, at least one tubing component (120) attached to at least a portion of the anchor component (110), and at least one elastic cord (130) comprising a first cord end (136) and a second cord end (138). At least a portion of the elastic cord (130) is disposed within the tubing component (120). In some embodiments, the first cord end (136) comprises a first attachment component (141), and the second cord end (138) comprises a second attachment component (142). In some embodiments, the first attachment component (141) can be coupled to one of the user's feet, and the second attachment component (142) can be coupled to the user's other foot.

Likewise, the wearable device (100) may comprise an anchor component (110) configured to encircle the torso of a user, a plurality of tubing components (120) attached to at least a portion of the anchor component (110), and a plurality of elastic cords (130) comprising a first cord end (136) and a second cord end (138). At least a portion of each of the plurality of elastic cords (130) is disposed within a tubing component (120). Moreover, the wearable device (100) may comprise an anchor component (110) configured to encircle the torso of a user, a plurality of channel components (170) attached to at least a portion of the anchor component (110), and a plurality of elastic cords (130) comprising a first cord end (136) and a second cord end (138). Each of the channel components (170) may comprise a plurality of channels, and at least a portion of each of the plurality of elastic cords (130) is disposed within a channel of each of the plurality of channel components (170). In some embodiments, the first cord end (136) comprises a first attachment component (141), and the second cord end (138) comprises a second attachment component (142).

Anchor Component:

As used herein, a "torso" refers to the central anatomical region, or core, within the human body, from which the head, neck, and limbs emanate. Moreover, this anatomical "torso," as described herein, can be further categorized into distinct segments, namely the thoracic segment (referred to interchangeably as the upper torso, from which the forelimbs extend), the abdominal segment (commonly denoted as the "mid-section"), and the pelvic and perineal segments (occasionally grouped together with the abdomen as the lower torso, from which the hindlimbs extend).

In some aspects, the anchor component (110) may be configured to encircle a torso of a user. In some embodiments, the anchor component (110) may be configured to encircle the waist of a user (e.g., the abdominal segment of the user). In some embodiments, the anchor component (110) may be configured to encircle the hips of a user (e.g., the lower torso of the user). In further embodiments, the anchor component (110) may be configured to encircle one or more sections of the torso of a user. For example, the anchor component (110) may be contoured such that a posterior portion of the anchor component (110) extends over the upper torso, and an anterior portion of the anchor component (110) extends over the lower torso of the user. In accordance with the present invention, the anchor component (110) may be worn at any position on the torso that is comfortable to the user.

In some embodiments, the anchor component (110) can fit snugly around the torso (e.g., the waist) of a user but also has the structural integrity to be worn loosely, e.g., suspended from a harness over the shoulders.

The anchor component (110) comprises an inner surface (111) and an outer surface (112) opposite the inner surface (111). In some embodiments, the inner surface (111) comprises a surface that is disposed towards the torso of a user. In some embodiments, the inner surface (111) of the anchor component (110) is configured to sit against the torso of a user, e.g., the inner surface (111) of the anchor component (110) is configured to be in contact with the torso of the user. In other embodiments, the inner surface (111) of the anchor component (110) is configured to loosely encircle the torso of a user, e.g., the inner surface (111) of the anchor component (110) is configured not to be in contact with the torso of the user. In certain embodiments, the anchor component (110) further comprises a buckle component, e.g., a ratcheting buckle component.

The anchor component (110) may further comprise detachable straps (e.g., detachable shoulder straps). In some embodiments, the anchor component (110) may comprise a harness, suspenders, or shoulder strap(s). In some embodiments, the anchor component (110) is supported by shoulder straps and/or a shoulder harness. As used herein, "shoulder strap" and "shoulder harness" may be used interchangeably and refer to straps that pass across the shoulders and hold up the anchor component (110) described herein. In some embodiments, the anchor component (110) may further comprise two shoulder straps connected by a sternum strap (e.g., a chest strap). In other embodiments, the anchor component (110) may comprise a shoulder harness connected by a sternum strap (e.g., a chest strap). The sternum strap (e.g., chest strap) may help to increase the stability of the stability of the shoulder straps. In some embodiments, the sternum strap (e.g., chest strap) may be disposed across the upper torso of the user.

In some embodiments, the anchor component is configured to wrap around the torso of the user and be supported by the shoulders through a harness/suspender that provides both postural support and proprioceptive input. In some embodiments, the anchor component is configured to loosely encircle the torso of the user and is supported by the shoulders through a shoulder harness/shoulder straps that provides both postural support and proprioceptive input. The anchor component (110) may be configured to loosely encircle the torso of the user such that the anchor component (110) does not restrict the breathing or any movements of the user.

In other embodiments, the anchor component (110) may be disposed within a waistband of a garment (e.g., shorts, trousers, or a skirt). In further embodiments, the anchor component (110) may comprise a belt. Finally, in some embodiments, the anchor component (110) may be secured in place by any means known in the art.

Additionally, the anchor component (110) described herein may also be used with other devices, including backpacks for camping, hiking, or military use (see FIG. 11).

In some embodiments, a harness (e.g., a shoulder harness) may be worn over the shoulders, and the anchor component (110) attaches to the harness in such a way that the weight of the device and the downward forces it creates are borne at an optimal location, e.g., the shoulders and upper back. Without wishing to limit the present invention to any theory or mechanism, it is believed that the aforementioned configuration of the anchor component (110; i.e., an anchor component (110) comprising a shoulder harness) improves balance while walking and posture in general.

In certain embodiments, the anchor component may be configured to separate (e.g., into a right portion and a left portion) anteriorly (e.g., towards the front of a user) at the center of the anchor component (110).

The anchor component (110) may be designed to strategically position the elastic cords (130). For example, the anchor component may comprise one or more means of aligning the elastic cords (130).

Aligning Components:

The anchor component (110) may further comprise a means for aligning the elastic cords (130) such that the elastic cords (130) are positioned to run either laterally or medially alongside a portion of a leg. In some embodiments, the means for aligning the elastic cords (130) comprises a tubing component (120), a channel component (170), a coupling component (180), or a combination thereof.

In other embodiments, the anchor component (110) may further comprise an aligning component configured to position the elastic cords (130) to run either laterally or medially alongside a portion of a leg. In some embodiments, the aligning component comprises a tubing component (120), a channel component (170), a coupling component (180), or a combination thereof.

As used herein, "medial" or "medially" refers to a position that is near or along the midline. As used herein, "lateral" or "laterally" refers to a position that is to the side of, or away from the middle.

In some embodiments, the means for aligning the first elastic cord (131) and the second elastic cord (132) such that the first elastic cord (131) is positioned to run laterally alongside a portion of a leg and the second elastic cord (132) is positioned to run medially alongside a portion of the leg. Alternatively, the aligning component may be configured to position the first elastic cord (131) and the second elastic cord (132) such that the first elastic cord (131) is positioned to run laterally alongside a portion of a leg and the second elastic cord (132) is positioned to run medially alongside a portion of the leg.

In some embodiments, the means of aligning the first elastic cord (131) and the second elastic cord (132) or the aligning component comprises a first tubing component (121) and a second tubing component (122). In other embodiments, the means of aligning the first elastic cord (131) and the second elastic cord (132) or the aligning component comprises one or more channel components (170), each comprising a first channel (171) and a second channel (172).

In further embodiments, the means of aligning the first elastic cord (131) and the second elastic cord (132) or the aligning component comprises a first tubing component (121) and a second tubing component (122) horizontally attached to at least a posterior portion of the anchor component (110) and two channel components each comprising a first channel (171) and a second channel (172) attached to at least a lateral portion of the anchor component (110).

In some embodiments, the anchor component (110) comprises one or more tubing components (120). In some embodiments, the tubing components (120) are disposed on a portion of the outer surface (112) of the anchor component (110). In other embodiments, the tubing components (120) are disposed on a portion of the inner surface (111) of the anchor component (110). In further embodiments, the tubing components (120) are disposed within the anchor component (110).

The tubing components (120) may be disposed posteriorly (e.g., towards the back of a user) on the anchor component (110). Or the tubing components (120) may be disposed anteriorly (e.g., towards the front of a user) on the anchor component (110). In some embodiments, the tubing components (120) may be disposed both posteriorly and anteriorly on the anchor component (110).

In some embodiments, the tubing components (120) are integrated into a portion of the anchor component (110), e.g., the tubing components (120) may be integrated into a posterior portion of the anchor component (110). In some embodiments, the tubing components (120) are removably attached to (e.g., detachable from) a portion of the anchor component (110), e.g., the tubing components (120) may be removable attached to (e.g., detachable from) a posterior portion of the anchor component (110).

In certain embodiments, the tubing components (120) may comprise various lengths, such that the elastic cords (130) are positioned to run either laterally or medially alongside a portion of a leg.

The tubing components (120) having a prescribed length and are disposed to extend substantially in the horizontal direction on the posterior side of the anchor component (110).

In some embodiments, the tubing components (120) are disposed directly onto a portion of the anchor component (110; e.g., a posterior portion). In other embodiments, the tubing components (120) are disposed horizontally (or nearly horizontally) on a portion of the anchor component (110; e.g., a posterior portion). In further embodiments, the tubing components (120) are disposed horizontally (or nearly horizontally) and directly onto a portion of the anchor component (110; e.g., a posterior portion). In some embodiments, the tubing components (120) are parallel to each other (see FIGS. 7B, 7C, and 7D). In other embodiments, the tubing components (120) cross over each other.

In some embodiments, the tubing component (120) may comprise a first tubing component (121), a second tubing component (122), a third tubing component (123), a fourth tubing component (124), or a combination thereof. The tubing components (120) described herein may facilitate a reduction in friction and drag and allow for smooth, reciprocating movement of the elastic cords (130). In some embodiments, the tubing components may support the elastic cords (130) and the movement of the elastic cords (130).

In some embodiments, the first tubing component (121) and the second tubing component (122) are both horizontally (or nearly horizontally) attached to at least a posterior portion of the anchor component (110). At least a portion of the first elastic cord (131) is disposed within the first tubing component (121), and at least a portion of the second elastic cord (132) is disposed within the second tubing component (122). In certain embodiments, the first tubing component (121) and the second tubing component (122) are parallel to each other.

The devices (100) described herein may further comprise a third tubing component (123) horizontally (or nearly horizontally) attached to at least a portion of the anchor component (110). At least a portion of the third elastic cord (133) is disposed within the third tubing component (123). In some embodiments, the first tubing component (121), the second tubing component (122), and the third tubing component (123) are parallel with each other.

The devices (100) described herein may further comprise a fourth tubing component (124) attached to at least a portion of the anchor component (110) and a fourth elastic cord (134). At least a portion of the fourth elastic cord (134) is disposed within the fourth tubing component (124). In some embodiments, the first tubing component (121), the second tubing component (122), the third tubing component (123), and the fourth tubing component (124) are parallel with each other.

In some embodiments, the anchor component (110) may further comprise one or more channel components (170). Each channel component (170) may comprise one or more channels. For example, the channel components (170) may comprise four channels, a first channel (171), a second channel (172), a third channel (173), and a fourth channel (174) (See FIG. 10B). In some embodiments, the channel components (170) comprises three channels; a first channel (171), a second channel (172), and a third channel (173). In other embodiments, the channel components (170) comprise two channels; a first channel (171) and a second channel (172). In some embodiments, the third channel (173) may be separated into two portions (see FIG. 10B). In some embodiments, the fourth channel (174) may be separated into two portions. In some embodiments, any of the channels (170) may be separated into two portions.

In some embodiments, the channel components (170) are disposed on a portion of the outer surface (112) of the anchor component (110). In other embodiments, the channel components (170) are disposed on a portion of the inner surface (111) of the anchor component (110). In further embodiments, the channel components (170) are disposed within the anchor component (110).

The channel components (170) may be disposed posteriorly (e.g., towards the back of a user) on the anchor component (110). Or the channel components (170) may be disposed anteriorly (e.g., towards the front of a user) on the anchor component (110). In other embodiments, the channel components (170) may be disposed laterally (e.g., on the sides of a user) on the anchor component (110). In some embodiments, the channel components (170) may be disposed both anteriorly and laterally on the anchor component (110). In other embodiments, the channel components (170) may be disposed posteriorly, anteriorly, laterally, or a combination thereof on the anchor component (110).

In some embodiments, the channel components (170) are integrated into a portion of the anchor component (110), e.g., the channel components (170) may be integrated into a posterior, anterior, or lateral portion of the anchor component (110). In some embodiments, the channel components (170) are removably attached to (e.g., detachable from) a portion of the anchor component (110), e.g., the tubing components (120) may be removable attached to (e.g., detachable from) a posterior, anterior, or lateral portion of the anchor component (110).

In some embodiments, each of the channels comprising a channel component (170) are of a similar length. In some embodiments, each of the channels comprising a channel component (170) are disposed to extend substantially in the horizontal direction on the anchor component (110). In certain embodiments, each of the channels comprising a channel component (170) are directly attached to each other. The channel components (170) are configured such that the elastic cords (130) disposed therethrough are positioned to run either laterally or medially alongside a portion of a leg.

In some embodiments, the channel components (170) are disposed directly onto a portion of the anchor component (110).

The channel component (170) described herein may facilitate a reduction in friction and drag and allow for smooth, reciprocating movement of the elastic cords (130). In some embodiments, the channel component (170) may support the elastic cords (130) and the movement of the elastic cords (130).

In some embodiments, at least a portion of the first elastic cord (131) is disposed within the first channel (171) of the one or more channel components (170), and at least a portion of the second elastic cord (132) is disposed within the second channel (172) of the one or more channel components (170). In other embodiments, at least a portion of the first elastic cord (131) is disposed within the first channel (171) of the one or more channel components (170), at least a portion of the second elastic cord (132) is disposed within the second channel (172) of the one or more channel components (170), and at least a portion of the third elastic cord (133) is disposed within the third channel (173) of the one or more channel components (170). In further embodiments, at least a portion of the first elastic cord (131) is disposed within the first channel (171) of the one or more channel components (170), at least a portion of the second elastic cord (132) is disposed within the second channel (172) of the one or more channel components (170), at least a portion of the third elastic cord (133) is disposed within the third channel (173) of the one or more channel components (170), and at least a portion of the fourth elastic cord (134) is disposed within the fourth channel (174) of the one or more channel components (170).

In some embodiments, the anchor component (110) may comprise a plurality of coupling components (180) that are configured to position the elastic cords (130) to run alongside the lateral or medial portion of a leg. In some embodiments, the coupling components (180) are disposed on the anchor component (110) and may be adjustable. In some embodiments, the coupling components reduce or minimize friction and drag on the elastic cords (130) and allow for smooth, reciprocating movement of the elastic cords (130). Non-limiting examples of coupling components (180) include but are not limited to hook, clip, fastener, ring, buckle, snap, strap, hook & loop, pulley, a combination thereof, or the like.

In some embodiments, the coupling components (180) are disposed on a portion of the outer surface (112) of the anchor component (110). In other embodiments, the coupling components (180) are disposed on a portion of the inner surface (111) of the anchor component (110). In further embodiments, the coupling components (180) channel components (170) are disposed within the anchor component (110).

The coupling components (180) may be disposed posteriorly (e.g., towards the back of a user) on the anchor component (110). Or the coupling components (180) may be disposed anteriorly (e.g., towards the front of a user) on the anchor component (110). In other embodiments, the coupling components (180) may be disposed laterally (e.g., on the sides of a user) on the anchor component (110). In some embodiments, the coupling components (180) may be disposed both anteriorly and laterally on the anchor component (110). In other embodiments, the coupling components (180) may be disposed posteriorly, anteriorly, laterally, or a combination thereof on the anchor component (110).

In some embodiments, the coupling components (180) are integrated into a portion of the anchor component (110), e.g., the coupling components (180) may be integrated into a posterior, anterior, or lateral portion of the anchor component (110). In some embodiments, the coupling components (180) are removably attached to (e.g., detachable from) a portion of the anchor component (110), e.g., the coupling components (180) may be removable attached to (e.g., detachable from) a posterior or lateral portion of the anchor component (110).

In some embodiments, the anchor component (110) may comprise tubing components (120) and channel components (170). For example, the anchor component (110) may comprises four tubing components (120; e.g., a first tubing component (121), a second tubing component (122), a third tubing component (123), and a fourth tubing component (124)) disposed on a posterior portion of the anchor component (110) and two channel components (170), each comprising four channels (a first channel (171), a second channel (172), a third channel (173), and a fourth channel (174), wherein one channel component (170*a*) is disposed on a lateral portion of the anchor component (110) and the other channel component (170*b*) is disposed opposite thereto.

In some embodiments, at least a portion of the first elastic cord (131) is disposed within the first tubing component (121) and the first channel (171) of each of the channel components (170), and at least a portion of the second elastic cord (132) is disposed within second tubing component (122) and the second channel (172) of each of channel components (170).

Furthermore, at least a portion of the third elastic cord (133) and/or the fourth elastic cord (134) may be disposed within the third and fourth tubing component (123, 124, respectively) and the third and fourth channel (173, 174, respectively) of each of the channel components (170).

In other embodiments, the anchor component (110) may comprise tubing components (120) and coupling components (180). For example, the anchor component (110) may comprise four tubing components (120; e.g., a first tubing component (121), a second tubing component (122), a third tubing component (123), and a fourth tubing component (124)) disposed on a posterior portion of the anchor component (110) and coupling components (180), disposed on a lateral and anterior portion of the anchor component (110).

Elastic Cords and Attachment Components:

In some embodiments, the elastic cords (130; e.g., a plurality of elastic cords) may comprise a first elastic cord (131), a second elastic cord (132), a third elastic cord (133), a fourth elastic cord (134), or a combination thereof.

In some embodiments, at least a portion of each of the elastic cords (130) is disposed within a tubing component (120), e.g., at least a portion of the first elastic cord (131) is disposed within the first tubing component (121) in a freely slidable manner. Thus, in some embodiments, at least a portion of the elastic cords (130) are disposed posteriorly (e.g., towards the back of a user) on the anchor component (110). Or, in other embodiments, at least a portion of the elastic cords (130) may be disposed anteriorly (e.g., towards the front of a user) on the anchor component (110).

In some embodiments, an elastic cord (130) is passed through a tubing component (120) freely slidably and extends out from both ends of the tubing component (120). In some embodiments, an intermediate portion of each of the elastic cords (130) is disposed within a tubing component (120) in a freely slidable manner.

In other embodiments, at least a portion of each of the elastic cords (130) is disposed within a channel of one or more channel components (170), e.g., at least a portion of the first elastic cord (131) is disposed within a first channel (171) of one or more channel component (170) in a freely slidable manner. In some embodiments, at least a portion of each of the elastic cords (130) is disposed through a coupling component (180) in a freely slidable manner.

In some embodiments, the elastic cords (130; e.g., the first elastic cord (131) and/or the second elastic cord (132)) may be of differing lengths. In some embodiments, the length of the elastic cords (130) may alter the tension level of said cord; e.g., a longer elastic cord (130) may have less tension than a shorter elastic cord (130).

In other embodiments, the elastic cords (130; e.g., the first elastic cord (131) and/or the second elastic cord (132)) may be of similar lengths (e.g., the same length). In some embodiments, when the lengths of the elastic cords are similar or the same, the tension levels of the cords are also similar or the same.

In some embodiments, the first elastic cord (131) and/or the third elastic cord (133) are positioned to run laterally alongside a portion of a leg, and the second elastic cord (132) and the fourth elastic cord (134) are positioned to run medially alongside a portion of the leg.

Each elastic cord (130) comprises a first cord end (136) and a second cord end (138). In some embodiments, the first cord end (136) comprises a first attachment component (141), and the second cord end (138) comprises a second attachment component (142). The first attachment component (141) and the second attachment component (142) may be selected from a group comprising a fastener, a clip, a snap, a hook, a ring, a strap (e.g., a velcro strap), a buckle, a pulley, a magnet, an adhesive, or a combination thereof.

In some embodiments, the attachment components (140; e.g., the first attachment component (141) and the second attachment component (142)) may be configured to attach to a shoe (e.g., a first shoe and a second shoe) of a user. In other embodiments, the attachment components (140; e.g., the first attachment component (141) and the second attachment component (142)) may be configured to attach to a brace, a wrap, or a garment for the foot.

In some embodiments, the first attachment component (141) may attach to a proximal end of a first shoe (e.g., either attaching medially or laterally) or a distal end of a first shoe (e.g., either attaching medially or laterally). In some embodiments, the first attachment component (141) may attach to a side (e.g., near the medial or lateral malleolus; e.g., proximally) of a first shoe, a toe portion (e.g., near the toe box; e.g., distally) of a first shoe or a combination thereof.

In some embodiments, the second attachment component (142) may attach to a proximal end of a second shoe (e.g., either attaching medially or laterally) or a distal end of a second shoe (e.g., either attaching medially or laterally). In some embodiments, the second attachment component (142) may attach to a side (e.g., near the medial or lateral malleolus; e.g., proximally) of a second shoe, a toe portion (e.g., near the toe box; e.g., distally) of a second shoe or a combination thereof.

Without wishing to limit the present invention to any theories or mechanisms, it is believed that an attachment component (140; e.g., a first attachment component (141) and/or a second attachment component (142)) attached to a shoe near the medial malleolus and/or lateral malleolus allows the ankle not to be pulled into plantar or dorsiflexion. Additionally, an attachment component (140; e.g., a first attachment component (141) and/or a second attachment component (142)) attached distally near the toe box (e.g., near the metatarsophalangeal joints of a foot) allows for the facilitation of dorsiflexion as an intervention for Drop Foot.

In some embodiments, the first attachment component (141) of a first elastic cord (131) may be attached to a first shoe near the lateral malleolus of a user (e.g., a first side of the first shoe at or near the collar/throat or an eyelet of the shoe; e.g., proximally) and the second attachment component (142) of a first elastic cord (131) may be attached to a second shoe near the lateral malleolus of a user, (e.g., a first side of the second shoe at or near the collar/throat or an eyelet of the shoe; e.g., proximally). In some embodiments, the first attachment component (141) of a second elastic cord (132) may be attached to a first shoe near the medial malleolus of a user (e.g., a second side of the first shoe at or near the collar/throat or an eyelet of the shoe; e.g., proximally) and the second attachment component (142) of the second elastic cord (132) may be attached to a second shoe near the medial malleolus of a user (e.g., a second side of the second shoe at or near the collar/throat or an eyelet of the shoe; e.g., proximally).

In other embodiments, the first attachment component (141) of a first elastic cord (131) may be attached to a first shoe using a shoelace eyelet or other attachment mechanism near the medial or lateral malleolus, and the second attachment component (142) of a first elastic cord (131) may be attached to a second shoe using a shoelace eyelet or other attachment mechanism near the medial or lateral malleolus. In some embodiments, the first attachment component (141) of a second elastic cord (132) may be attached to a first shoe using a shoelace eyelet or other attachment mechanism near the medial or lateral malleolus, and the second attachment component (142) of a second elastic cord (132) may be attached to a second shoe using a shoelace eyelet or other attachment mechanism near the medial or lateral malleolus.

In some embodiments, the first attachment component (141) of a third elastic cord (133) may be attached to a first shoe near the lateral malleolus of a user (e.g., a first side of the first shoe at or near the toe box; e.g., distally) and the second attachment component (142) of a third elastic cord (133) may be attached to a second shoe near the lateral malleolus of a user, (e.g., a first side of the second shoe at or near the toe box; e.g., distally). In some embodiments, the first attachment component (141) of a fourth elastic cord (134) may be attached to a first shoe near the medial malleolus of a user (e.g., a second side of the first shoe at or near the toe box; e.g., distally) and the second attachment component (142) of the fourth elastic cord (134) may be attached to a second shoe near the medial malleolus of a user (e.g., a second side of the second shoe at or near the toe box; e.g., distally).

In alternative embodiments, the first cord end (136) of the first elastic cord (131) and the first cord end (136) of the second elastic cord (132) may be adjoined as to create a stirrup for a first foot of a user and the second cord end (138) of the first elastic cord (131) and the second cord end (138) of the second elastic cord (132) may be adjoined as to create a stirrup for a second foot of a user.

In some embodiments, the first cord end (136) of an elastic cord (130) may attach directly to the anchor component (110), and the second cord end (138) of the elastic cord (130) may attach to the user's shoe. For example, the first cord ends (136) of the first elastic cord (131) and the second elastic cord (132) may attach directly to the anchor component (110), and the second cord ends (138) of the first elastic cord (131) and the second elastic cord (132) attach to the user's shoe. In other embodiments, the first cord ends (136) of a third elastic cord (133) and a fourth elastic cord (134) may attach directly to the anchor component (110), and the second cord ends (138) of the third elastic cord (133), and a fourth elastic cord (134) may attach to the user's shoe.

In some embodiments, each elastic cord (130) attaches to a first shoe, runs either laterally or medially alongside a first leg, runs through a tubing component (120) disposed on the anchor component (110), then runs either laterally or medially alongside a second leg and attaches to a second shoe. For example, the first elastic cord (131) attaches to a first shoe (e.g., via a first attachment component (140)) runs laterally alongside a first leg of a user, runs through the first tubing component (121) disposed on the anchor component (110), then runs laterally alongside a second leg of a user and attaches to a second shoe (e.g., via a second attachment component (142)). Likewise, the second elastic cord (132) attaches to a first shoe (e.g., via a first attachment component (141)) runs medially alongside a first leg of a user, runs through the second tubing component (122) disposed on the anchor component (110), then runs medially alongside a second leg of a user and attaches to a second shoe (e.g., via a second attachment component (142)).

At least a portion of the elastic cords (130) may be disposed anteriorly (e.g., towards the front of a user) on the anchor component (110).

In some embodiments, the elastic cords (130) may have the same diameters. In other embodiments, the elastic cords (130) may be of different diameters. For example, the first elastic cord (131) and the second elastic cord (132), e.g., the cords that attach to the proximal end of a shoe, may have a larger diameter than the third elastic cord (133), and the fourth elastic cord (134), e.g., the cords that attach to the distal end of a shoe. In some embodiments, the elastic cords (130) may have the same cord tension. In other embodiments, the elastic cords (130) may have different cord tensions. For example, the first elastic cord (131) and the second elastic cord (132), e.g., the cords that attach to the proximal end of a shoe, may have a larger cord tension than the third elastic cord (133), and the fourth elastic cord (134), e.g., the cords that attach to the distal end of a shoe.

In some embodiments, the wearable devices (100) described herein may measure tension. For example, the elastic cords (130) may comprise markings disposed thereon. In some embodiments, the markings may allow for the quantification of adjustments or mark progress with measured clinical or fitness outcomes.

Other Components:

The devices (100) described herein may further comprise one or more cuffs (150) operatively connected to one or more cords (130). In some embodiments, a first cuff (151) is operatively coupled to at least one elastic cord (130), and a second cuff (152) is operatively coupled to at least one elastic cord (130). The cuffs (150) described herein may be configured to wrap around a leg of a user (e.g., below the knee of the user). In some embodiments, the first cuff (151) is configured to wrap around a first leg of a user (e.g., below the knee of a user), and the second cuff (152) is configured to wrap around a second leg of the user (e.g., below the knee of a user). In some embodiments, the one or more cuffs (150) may be configured to secure one or more elastic cords (130) against a leg of the user. Additionally, the cuffs (150) described herein serve to guide the one or more cords and optimize their angle.

The cuff (150) may further comprise a first guide (156) and a second guide (158) disposed on an outer surface of the first and second cuffs (151, 152). In some embodiments, the first guide (156) and the second guide (158) are configured to allow one or more elastic cords (130) to pass therethrough.

The devices (100) described herein may further comprise an elastic cord cover (160; e.g., a first elastic cord cover (161) and/or a second elastic cord cover (162)). In some embodiments, the elastic cord cover (160) comprises a first cover end (166) and a second cover end (168). The elastic cord cover (160) is configured such that a portion of an elastic cord is disposed therethrough. In some embodiments, the first cover end (166) is disposed at or near the cuff (150). In some embodiments, the second end cover (168) is disposed at or near a shoe of a user. The one or more cuffs (150) may be held in place (e.g., held below the knee of a user) with an elastic cord cover (160), such as to prevent the cuff (150) from falling down the leg.

Wearable Devices:

The present invention may also feature a wearable device (100) for assisting in the movement of lower limbs comprising an anchor component (110) configured to encircle a torso of a user, first and second tubing components (121, 122) attached to at least a portion of the anchor component (110), and a first and second elastic cord (131, 132) both comprising a first cord end (136) and a second cord end (138). A portion of the first elastic cord (131) may be disposed within the first tubing component (121), and a portion of the second elastic cord (132) may be disposed within the second tubing component (122). In some embodiments, the first cord end (136) comprises a first attachment component (141) and the second cord end (138) comprises a second attachment component (142).

In some embodiments, the first tubing component (121) and the second tubing component (122) are parallel to each other. In other embodiments, the first tubing component (121) and the second tubing component (122) cross over each other.

The devices described herein may further comprise a first cuff (151) operatively coupled to the first elastic cord (131) and the second elastic cord (132), and a second cuff (152) operatively coupled to the first elastic cord (131) and the second elastic cord (132). In some embodiments, the first cuff (151) is configured to wrap around a first leg of a user (e.g., below the knee of a user), and the second cuff (152) is configured to wrap around a second leg of the user (e.g., below the knee of a user). The first cuff (151) and the second cuff (152) may further comprise a first guide (156) and a second guide (158) disposed on an outer surface of the first and second cuffs (151, 152). In some embodiments, the first elastic cord (131) is configured to pass through the first guide (156) of the first cuff (151) and the first guide (156) of the second cuff (152), and the second elastic cord (132) is configured to pass through the second guide (158) of the first cuff (151) and the second guide (158) of the second cuff (152).

The devices (100) described herein may further comprise a first elastic cord cover (161) and a second elastic cord cover, each comprising a first cover end (166) and a second cover end (168). In some embodiments, the first cover end (166) is disposed at or near the cuff (150). In some embodiments, the second end cover (168) is disposed at or near a shoe of a user. The elastic cord cover (160) is configured such that a portion of an elastic cord is disposed therethrough. For example, the device (100) may comprise a first elastic cord cover (161) comprising a first cord cover end (166) disposed (e.g., medially) at or near the first cuff (151) and a second cord cover end (168) disposed at or near a first shoe (e.g., near a medial portion of the first shoe) with a portion of the second elastic cord (132) disposed therethrough. Additionally, the device may comprise a second elastic cord cover (162) comprising a first cord cover end (166) disposed (e.g., medially) at or near the second cuff (152) and a second cord cover end (168) disposed at or near a second shoe (e.g., near a medial portion of the second shoe) with a portion of the second elastic cord (132) disposed therethrough (See FIG. 1).

Alternatively, the device (100) may comprise a first elastic cord cover (161) comprising a first cord cover end (166) disposed (e.g., laterally) at or near the first cuff (151) and a second cord cover end (168) disposed at or near a first shoe (e.g., near a lateral portion of the first shoe) with a portion of the first elastic cord (131) disposed therethrough. Additionally, the device may comprise a second elastic cord cover (162) comprising a first cord cover end (166) disposed (e.g., laterally) at or near the second cuff (152) and a second cord cover end (168) disposed at or near a second shoe (e.g., near a lateral portion of the second shoe) with a portion of the first elastic cord (131) disposed therethrough.

In some embodiments, the devices (100) described herein may comprise a combination of the aforementioned arrangements of the elastic cord covers (160), e.g., the device (100) may comprise a first elastic cord cover (161) comprising a first cord cover end (166) disposed (e.g., laterally) at or near the first cuff (151) and a second cord cover end (168) disposed at or near a first shoe (e.g., near a lateral portion of the first shoe) with a portion of the first elastic cord (131) disposed therethrough and a second elastic cord cover (162) comprising a first cord cover end (166) disposed (e.g., medially) at or near the second cuff (152) and a second cord cover end (168) disposed at or near a second shoe (e.g., near a medial portion of the second shoe) with a portion of the second elastic cord (132) disposed therethrough.

In some embodiments, the device (100) comprises one elastic cord cover (160). In some embodiments, the devices described (100) herein comprise two elastic cord covers (160). In other embodiments, the devices described (100) herein comprise three elastic cord covers (160). In further embodiments, the devices described (100) herein comprise four elastic cord covers (160). In some embodiments, the devices described (100) herein comprise a plurality of elastic cord covers (160). The one or more elastic cord covers (160) may help to keep the one or more cuffs (150) in place (e.g., below the knee of a user) and prevent the cuff (150) from falling down the leg (i.e., towards the shoes of a user).

The devices (100) described herein may further comprise a third tubing component (123) attached to at least a portion of the anchor component (110) and a third elastic cord (133) comprising a first cord end (136) and a second cord end (138). At least a portion of the third elastic cord (133) is disposed within the third tubing component (123). In some embodiments, the first cord end (136) of the third elastic cord (133) comprises a first attachment component (141) and the second cord end (138) of the third elastic cord (133) comprises a second attachment component (142). In some embodiments, the third elastic cord (133) may have a smaller diameter or less tension than the first elastic cord (131) and/or the second elastic cord (132).

In some embodiments, the third cord (133) may be disposed through the first cuff (151) and the second cuff (152), e.g., disposed through the first guide (156) of the first cuff (151) and the first guide (156) of the second cuff (152) or disposed through the second guide (158) of the first cuff (151) and the second guide (158) of the second cuff (152). In some embodiments, the first and second cuffs (151, 152) of the devices described herein allow for the optimization of the angle of the third cord (133) attaching to the eyelets or fasteners on the medial and/or lateral aspect of the shoe near the metatarsophalangeal joints to provide/facilitate dorsiflexion.

In some embodiments, the first attachment component (141) and/or second attachment component (142) of an elastic cord (130; e.g., a first elastic cord (131), a second elastic cord (132) and/or a third elastic cord (133) attaches to a proximal end of a first shoe (e.g., either attaching medially or laterally), the first attachment component (141) and/or second attachment component (142) of an elastic cord (130) attaches to a distal end of a first shoe (e.g., either attaching medially or laterally), or a combination thereof (e.g., a first attachment component (141) attaches to a proximal end of a first shoe and a second attachment component (142) attaches to a distal end of a second shoe or vice versa).

In preferred embodiments, the first cord end (136) and the second cord end (138) of the first elastic cord (131) attach to a first side of a first and second shoe (e.g., near the lateral malleolus of a user), the first cord end (136) and the second cord end (138) of the second elastic cord (132) attaches to a second side of a first and second shoe (e.g., near the medial malleolus of a user), and the first cord end (136) and the second cord end (138) of the third elastic cord (133) attaches to a center portion of a first and second shoe (e.g., near the metatarsophalangeal joints of a user). Without wishing to limit the present invention to any theories or mechanisms, it is believed that the aforementioned arrangement of the first elastic cord (131), the second elastic cord (132), and the third elastic cord (133) provides optimal dorsiflexion (e.g., lift) without straining joints of the toes. In some embodiments, the third elastic cord (133) may have a smaller diameter or less tension than the first elastic cord (131) and/or the second elastic cord (132).

The attachment components (140; e.g., the first attachment component (141) and the second attachment component (142)) may be attached laterally to (i.e., attached to the outer side of) a shoe (e.g., a first shoe or a second shoe), medially to (e.g., attached to the inner side of) a shoe (e.g., a first shoe or a second shoe), or a combination thereof. The attachment components (140; e.g., the first attachment component (141) and the second attachment component (142)) may be attached to the shoe near the medial and lateral malleolus or may be attached to the toe/throat aspect of the shoe.

The devices (100) described herein may further comprise a fourth tubing component (124) attached to at least a portion of the anchor component (110) and a fourth elastic cord (134) comprising a first cord end (136) and a second cord end (138). At least a portion of the fourth elastic cord (134) is disposed within the fourth tubing component (124). In some embodiments, the first cord end (136) of the fourth elastic cord (134) comprises a first attachment component (141) and the second cord end (138) of the fourth elastic cord (134) comprises a second attachment component (142). In some embodiments, the fourth elastic cord (134) may have a smaller diameter or less tension than the first elastic cord (131) and/or the second elastic cord (132).

In some embodiments, the first cord end (136) and the second cord end (138) of the fourth elastic cord (134) attach to a proximal end of a shoe (e.g., either attaching medially or laterally). In other embodiments, the first cord end (136) and the second cord end (138) of the fourth elastic cord (134) attach to a distal end of a shoe (e.g., either attaching medially or laterally). In some embodiments, the first cord end (136) and the second cord end (138) of the fourth elastic cord (134) attach to a center portion of a first and/or second shoe (e.g., near the metatarsophalangeal joints of a user).

The present invention may also feature a wearable device (100) for assisting in the movement of lower limbs comprising an anchor component (110) configured to encircle a torso of a user, first, second, and third tubing components (121, 122, 123) attached to at least a portion of the anchor component (110), and a first, second, and third elastic cord (131, 132, 133) comprising a first cord end (136) and a second cord end (138). The first elastic cord (131) is disposed within a portion of the first tubing component (121), the second elastic cord (132) is disposed within a portion of the second tubing component (122), and the third elastic cord (133) is disposed within a portion of the third tubing component (123). In some embodiments, the first cord end (136) comprises a first attachment component (141) and the second cord end (138) comprises a second attachment component (142).

The aforementioned device (100) may further comprise a fourth tubing component (124) attached to at least a portion of the anchor component (110) and a fourth elastic cord (134) comprising a first cord end (136) and a second cord end (138). At least a portion of the fourth elastic cord (134) is disposed within the third tubing component (124). In some embodiments, the first cord end (136) of the fourth elastic cord (134) comprises a first attachment component (141) and the second cord end (138) of the fourth elastic cord (134) comprises a second attachment component (142). In some embodiments, the fourth elastic cord (134) may have a smaller diameter or less tension than the first elastic cord (131) and/or the second elastic cord (132).

For each of the cords (130), lowering the first cord end (136) causes the second cord end (138) to rise (e.g., relative to the first cord end (136) and vice versa, i.e., lowering the second cord end (138) causes the first cord end (136) to rise (e.g., relative to the second cord end (138). Pulling of the first cord end (132) elevates the second cord end (134) relative to the first cord end (132), and pulling of the second cord end (134) elevates the first cord end (132) relative to the second cord end (138).

The benefits of integrating muscle and tendon groups such that they anchor at a distal point on one limb, transverse the body, and connect to the distal point of another limb are well documented. Core principles of Yoga and Pilates include full body alignment, core stability, and balancing opposing muscle groups with flowing movements. In addition, principles of the "Serape Effect," meaning using the body's natural tendency to use stronger muscles to assist weaker muscles through movement, torque, and rotation, are used in sports training as well as rehabilitation. The design of the present invention delivers similar benefits. Users with weakened limbs can walk greater distances over a longer period of time. A surprising additional benefit is rendered by the cross-body leverage: extra stability and improved balance. The use of a shoulder harness and the reciprocal tension in the cords continually realigns and rebalances the dispersion of much of the stress borne by the injured/debilitated limb/leg/foot to the user's shoulders and hips. This reduces the load on an injured or weakened limb and gives the user freedom to move with less pain.

To summarize it is the cross-body support and reciprocal recoil which allow this device to stabilize the injured/debilitated limb in such a way that its muscles and nerves are still engaged in normal interaction with the rest of the body. This creates the possibility for rehabilitation that current devices do not.

Without wishing to limit the present invention to any theories or mechanisms, it is believed that when using any of the devices of the present invention, the weight of the user's legs is supported, and the hip flexion (e.g., leg lifting) is facilitated.

In some embodiments, the devices (100) described herein may be customizable to an individual user. In other embodiments, the devices (100) described herein are a "one size fits all" configuration.

In some embodiments, the devices (100) described herein may be configured to be worn over a user's clothing. In other embodiments, the devices (100) described herein may be configured to be worn under a user's clothing.

In some preferred embodiments, the devices described herein do not require the use of an actuator or a power source.

In some embodiments, the present invention features a wearable device (100) configured to attach to a user's shoes to assist in the movement of the user's legs. The device (100) may comprise an anchor component (110) configured to encircle the torso of the user. In some embodiments, the anchor component (110) may be attached to a harness supported by the shoulders to create more stability and may be secured in place. The anchor component (110) may have one or more tubing components (120) attached thereon. The device (110) may further comprise one or more elastic cords (130) disposed within the tubing components (120). In some embodiments, the tubing components (120) are disposed such that their openings on the anchor component (110) are at points corresponding to advantageous descent of the elastic cords (130), typically along the lateral and medial surfaces of each leg. Each elastic cord (130) may comprise a first cord end (136), a first attachment component (141), a second cord end (138), and a second attachment component (142). Each first cord end (141) may attach to a shoe of the user by a first attachment component (141), and each second cord end (142) may attach to the other shoe of the user by a second attachment component (142).

When the user initiates the action of taking a step forward with either leg, for either cord, lowering the cord-end, which is fastened to the appropriate eyelet in the shoe (or other attachment processes/mechanisms) by its attachment component, stretches the cord, creating elastic tension, which pulls up that cord's other cord-end and its other attachment component, which is fastened to the appropriate eyelet of shoes (or other attachment processes/mechanisms), in the opposite shoe of the trailing leg. This, in turn, pulls that shoe up, helping the user lift their foot up to begin the forward motion of the trailing leg moving forward in the stride. Conversely, as the trailing leg moves forward and becomes the leading leg completing the step forward, as that foot descends, the process is repeated. Thus a repeating, rhythmic, reciprocal action is initiated, which continually translates free energy created by the downward gravitational pull from the forward step into elastic tension energy, pulling up the trailing foot at the exact time it needs clearance to move forward. This is a much different and more beneficial action than is found in current elastic walking assist devices that simply attach elastic cords to a torso or pelvic strap-type belt only, without the shoulders harness, and a shoe or shoes via the shoelaces. In those devices, the action of the cords is confined to each individual leg; there is no crossover action to the opposite leg. The benefits of muscle and tendon groups anchored at a distal point on one limb, transversing the body, and attaching at the distal point of another limb are well documented. One example of this is known as the "Serape Effect," which optimizes the balance and power it generates and is a focus of training regimens in many sports. The design of the present invention delivers similar benefits. Users with weakened limbs can walk greater distances over a longer period of time. A surprising additional benefit is rendered by the cross leverage, constant rebalancing, and reciprocal tension in the cords. It provides the user extra stability and may improve posture. The one or more tubing and/or channel components may allow for near frictionless undulation of the one or more cords.

The present invention may also feature a method of assisting with the movement of lower limbs of a user. The method may comprise fitting a user with a device (100) as described herein. In some embodiments, a first attachment component (141) of a first elastic cord (131) is attached proximally to a first side of a first shoe, and a second attachment component (141) of the first elastic cord (131) is attached proximally to the first side of a second shoe; a first attachment component (141) of a second elastic cord (132) is attached proximally to a second side of the first shoe and a second attachment component (141) of the second elastic cord (132) is attached proximally to the second side of the second shoe. In some embodiments, the first shoe is disposed on a first foot of the user, and the second shoe is disposed on the second foot of the user. The method may further comprise advancing the first foot of the user and then advancing the second foot of the user. The aforementioned steps may then be repeated. In some embodiments, advancing the first foot of the user stretches the first and second elastic cord (131, 132) and creates elastic tension, which pulls the second cord end (138) of the first and second elastic cord (131, 132) of the second shoe, elevating the second shoe and advancing the second foot of the user stretches the first and second elastic cord (131, 132) and creates elastic tension, which pulls the first cord end (136) of the first and second elastic cord (131, 132) of the first shoe, elevating the first shoe.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims. In some embodiments, the figures presented in this patent application are drawn to scale, including the angles, ratios of dimensions, etc. In some embodiments, the figures are representative only and the claims are not limited by the dimensions of the figures. In some embodiments, descriptions of the inventions described herein using the phrase "comprising" includes embodiments that could be described as "consisting essentially of" or "consisting of", and as such the written description requirement for claiming one or more embodiments of the present invention using the phrase "consisting essentially of" or "consisting of" is met.

The reference numbers recited in the below claims are solely for ease of examination of this patent application, and are exemplary, and are not intended in any way to limit the scope of the claims to the particular features having the corresponding reference numbers in the drawings.

Embodiments

The following embodiments are intended to be illustrative only and not to be limiting in any way.

Embodiment 1: A wearable device (100) for assisting in the movement of lower limbs, the device (100) comprising: a) an anchor component (110) configured to wrap around a torso of a user; b) a first elastic cord (131) and a second elastic cord (132), both comprising a first cord end (136) and a second cord end (138); wherein at least a portion of the first elastic cord (131) and the second elastic cord (132) is disposed on the anchor component (110); and c) a means for aligning the first elastic cord (131) and the second elastic cord (132) such that the first elastic cord (131) is positioned to run laterally alongside a portion of a leg and the second elastic cord (132) is positioned to run medially alongside a portion of the leg.

Embodiment 2: A wearable device (100) for assisting in the movement of lower limbs, the device (100) comprising: a) an anchor component (110) configured to wrap around a torso of a user; b) a first elastic cord (131) and a second elastic cord (132), both comprising a first cord end (136) and a second cord end (138); wherein at least a portion of the first elastic cord (131) and the second elastic cord (132) is disposed on the anchor component (110); and c) an aligning component configured to position the first elastic cord (131) and the second elastic cord (132) such that the first elastic cord (131) is positioned to run laterally alongside a portion of a leg and the second elastic cord (132) is positioned to run medially alongside a portion of the leg.

Embodiment 3: The wearable device (100) of embodiment 1, wherein the means of aligning the first elastic cord (131) and the second elastic cord (132) comprises a first tubing component (121) and a second tubing component (122).

Embodiment 4: The wearable device (100) of embodiment 2, wherein the aligning component comprises a first tubing component (121) and a second tubing component (122).

Embodiment 5: The wearable device (100) of embodiment 3 or embodiment 4, the first tubing component (121), and the second tubing component (122) are both horizontally attached to at least a posterior portion of the anchor component (110).

Embodiment 6: The wearable device (100) of any one of embodiments 3-5, wherein at least a portion of the first elastic cord (131) is disposed within the first tubing component (121) and at least a portion of the second elastic cord (132) is disposed within the second tubing component (122).

Embodiment 7: The wearable device (100) of any one of embodiments 3-6, wherein the first tubing component (121) and the second tubing component (122) are parallel with each other.

Embodiment 8: The wearable device (100) of any one of embodiments 3-7 further comprising a third tubing component (123) horizontally attached to at least a portion of the anchor component (110) and a third elastic cord (133) comprising a first cord end (136) and a second cord end (138); wherein a portion the third elastic cord (133) is disposed within the third tubing component (123).

Embodiment 9: The wearable device (100) of any embodiment 8, wherein the first tubing component (121), the second tubing component (122), and the third tubing component (123) are parallel with each other.

Embodiment 10: The wearable device (100) of embodiment 8 or embodiment 9 further comprising a fourth tubing component (124) attached to at least a portion of the anchor component (110) and a fourth elastic cord (134) comprising a first cord end (136) and a second cord end (138); wherein a portion the fourth elastic cord (134) is disposed within the fourth tubing component (124).

Embodiment 11: The wearable device (100) of embodiment 10, wherein the first tubing component (121), the second tubing component (122), the third tubing component (123), and the fourth tubing component (124) are parallel with each other.

Embodiment 12: The wearable device (100) of embodiment 1, wherein the means of aligning the first elastic cord (131) and the second elastic cord (132) comprises one or more channel components (170), each comprising a first channel (171) and a second channel (172).

Embodiment 13: The wearable device (100) of embodiment 2, wherein the aligning component comprises one or more channel components (170), each comprising a first channel (171) and a second channel (172).

Embodiment 14: The wearable device (100) of embodiment 12 or embodiment 13, wherein at least a portion of the first elastic cord (131) is disposed within the first channel (171) of the one or more channel components (170) and at least a portion of the second elastic cord (132) is disposed within the second channel (172) of the one or more channel components (170).

Embodiment 15: The wearable device (100) of embodiment 1, wherein the means of aligning the first elastic cord (131) and the second elastic cord (132) comprises a first tubing component (121) and a second tubing component (122) horizontally attached to at least a posterior portion of the anchor component (110) and two channel components each comprising a first channel (171) and a second channel (172) attached to at least a lateral portion of the anchor component (110).

Embodiment 16: The wearable device (100) of embodiment 2, wherein the aligning component comprises a first tubing component (121) and a second tubing component (122) horizontally attached to at least a posterior portion of the anchor component (110) and two channel components each comprising a first channel (171) and a second channel (172) attached to at least a lateral portion of the anchor component (110).

Embodiment 17: The wearable device (100) of embodiment 15 or embodiment 16, wherein at least a portion of the first elastic cord (131) is disposed within the first tubing component (121) and the first channel (171) of each of the channel components (170) and at least a portion of the second elastic cord (132) is disposed within second tubing component (122) and the second channel (172) of each of channel components (170).

Embodiment 18: The wearable device (100) of any one of embodiments 1-17 further comprises a shoulder harness configured to be worn over the user's shoulders, wherein the anchor component (110) is suspended from the shoulder harness and such that the anchor component (110) is supported by the user's shoulders.

Embodiment 19: The wearable device (100) of any one of embodiments 1-18 further comprising a first cuff (151) operatively coupled to the elastic cords (130), and a second cuff (152) operatively coupled to the elastic cords (131), wherein the first cuff (151) is configured to wrap around a first leg of a user, and the second cuff (152) is configured to wrap around a second leg of the user.

Embodiment 20: The wearable device (100) of embodiment 19, wherein the first cuff (151) and the second cuff (152) further comprising a first guide (156) and a second guide (158) disposed on an outer surface of the first and second cuffs (151, 152).

Embodiment 21: The wearable device (100) of embodiment 20, wherein the first elastic cord (131) and/or third elastic cord (133) is configured to pass through the first guide (156) of the first cuff (151) and the first guide (156) of the second cuff (152), and the second elastic cord (132) and/or the fourth elastic cord (134) is configured to pass through the second guide (158) of the first cuff (151) and the second guide (158) of the second cuff (152).

Embodiment 22: The wearable device of any one of embodiment 1-21, wherein each of the first cord end (136) comprises a first attachment component (141), and each of the second cord end (138) comprises a second attachment component (142).

Embodiment 23: The wearable device (100) embodiment 22, wherein the first attachment component (141) and the second attachment component (142) are selected from a group comprising a fastener, a clip, a velcro strap, and an adhesive.

Embodiment 24: The wearable device (100) embodiment 22 or embodiment 23, wherein the first attachment component (141) attaches to a proximal end or a distal end of a first shoe and the second attachment component (142) attaches to a proximal end or a distal end of a second shoe.

Embodiment 25: The wearable device (100) of any one of embodiments 22-24, wherein the first attachment component (141) attaches to a medial or lateral portion of the first shoe and the second attachment component (142) attaches to a medial or lateral portion of the second shoe.

Embodiment 26: The wearable device (100) of embodiment 25, wherein pulling of the first cord end (132) attached to the first shoe elevates the second shoe attached to the second cord end (134) relative to the first cord end (132), and pulling of the second cord end (134) attached to the second shoe elevates the first shoe attached to the first cord end (132) relative to the second cord end (138).

Embodiment 27: The wearable device (100) of any one of embodiments 1-26, wherein the means for aligning the first elastic cords (131) and the second elastic cord (132) allow for frictionless undulation of the first elastic cords (131) and the second elastic cord (132).

Embodiment 28: The wearable device (100) of any one of embodiments 2-26, wherein the aligning component allows for frictionless undulation of the first elastic cords (131) and the second elastic cord (132).

Embodiment 29: A method of assisting with the movement of lower limbs of a user; the method comprising: a) fitting a user with a device (100) according to any one of embodiments 1-28; wherein the first attachment component (141) of the first elastic cord (131) is attached proximally to a first side of the first shoe and the second attachment component (141) of the first elastic cord (131) is attached proximally to the first side of the second shoe; and wherein a first attachment component (141) of a second elastic cord (132) is attached proximally to a second side of the first shoe and a second attachment component (141) of the second elastic cord (132) is attached proximally to the second side of the second shoe; wherein the first shoe is disposed on a first foot of the user and the second shoe is disposed on the second foot of the user; b) advancing the first foot of the user; wherein advancing the first foot of the user stretches the first and second elastic cord (131, 132) and creates elastic tension, which pulls the second cord end (138) of the first and second elastic cord (131, 132) of the second shoe, elevating the second shoe; c) advancing the second foot of the user; wherein advancing the second foot of the user stretches the first and second elastic cord (131, 132) and creates elastic tension, which pulls the first cord end (136) of the first and second elastic cord (131, 132) of the first shoe, elevating the first shoe; and repeating steps b) and c).

What is claimed is:

1. A wearable device (100) for assisting in the movement of lower limbs, the device (100) comprising:

a) an anchor component (110) configured to wrap around a torso of a user;

b) a first elastic cord (131) and a second elastic cord (132), both comprising a first cord end (136) and a second cord end (138); wherein at least a portion of each of the first elastic cord (131) and the second elastic cord (132) is disposed on the anchor component (110);

c) a first cuff (151) and a second cuff (152), each comprising a first guide (156) and a second guide (158) disposed on an outer surface, wherein the first cuff (151) is configured to wrap around a first leg of a user, and the second cuff (152) is configured to wrap around a second leg of the user;

wherein the first elastic cord (131) is configured to pass through the first guide (156) of the first cuff (151) and the first guide (156) of the second cuff (152), and the second elastic cord (132) is configured to pass through the second guide (158) of the first cuff (151) and the second guide (158) of the second cuff (152); and d) a means for aligning the first elastic cord (131) and the second elastic cord (132) such that the first elastic cord (131) is positioned to run alongside a lateral portion of both the first leg and the second leg and the second elastic cord (132) is positioned to run alongside a medial portion of both the first leg and the second leg.

* * * * *